(12) United States Patent
Ray et al.

(10) Patent No.: US 12,211,213 B2
(45) Date of Patent: Jan. 28, 2025

(54) IMAGE PROCESSING METHOD, IMAGE PROCESSING APPARATUS, AND IMAGE PROCESSING SYSTEM

(71) Applicant: HITACHI HIGH-TECH CORPORATION, Tokyo (JP)

(72) Inventors: Anirban Ray, Tokyo (JP); Hideharu Hattori, Tokyo (JP); Yasuki Kakishita, Tokyo (JP); Taku Sakazume, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 703 days.

(21) Appl. No.: 17/605,349

(22) PCT Filed: Feb. 6, 2020

(86) PCT No.: PCT/JP2020/004529
§ 371 (c)(1),
(2) Date: May 9, 2022

(87) PCT Pub. No.: WO2020/217643
PCT Pub. Date: Oct. 29, 2020

(65) Prior Publication Data
US 2023/0177699 A1 Jun. 8, 2023

(30) Foreign Application Priority Data
Apr. 26, 2019 (JP) ................................. 2019-085082

(51) Int. Cl.
*G06T 7/194* (2017.01)
*G06T 7/12* (2017.01)
(Continued)

(52) U.S. Cl.
CPC ................ *G06T 7/194* (2017.01); *G06T 7/12* (2017.01); *G06V 10/267* (2022.01); *G06V 10/60* (2022.01);
(Continued)

(58) Field of Classification Search
CPC ........... G06T 7/194; G96T 7/12; G06V 10/60; G06V 10/98; G06V 10/267; G06V 10/764
See application file for complete search history.

(56) References Cited

U.S. PATENT DOCUMENTS

| | | | |
|---|---|---|---|
| 5,671,290 A | 9/1997 | Vaidyanathan | |
| 2017/0091948 A1* | 3/2017 | Paradkar | G06T 7/73 |

FOREIGN PATENT DOCUMENTS

| | | |
|---|---|---|
| JP | 2006-018394 A | 1/2006 |
| JP | 2017-111816 A | 6/2017 |

OTHER PUBLICATIONS

Song, Jie, Liang Xiao, and Zhichao Lian. "Boundary-to-marker evidence-controlled segmentation and MDL-based contour inference for overlapping nuclei." IEEE journal of biomedical and health informatics 21, No. 2 (2015): 451-464. (Year: 2015).*

(Continued)

*Primary Examiner* — David Perlman
(74) *Attorney, Agent, or Firm* — Volpe Koenig

(57) ABSTRACT

In order to perform quantitative analysis on an object in an image, it is important to accurately identify the object, but when plural objects are in contact with each other, it is potential that a target portion cannot be accurately identified. An image is segmented into a foreground region and a background region, the foreground region being a region in which an object for which quantitative information is to be calculated is shown, and the background region being a region other than the foreground region. With respect to a first object and a second object in contact with each other in (Continued)

the image, a contact point between the first object and the second object is detected based on a region segmentation result output by a segmentation unit. The first object and the second object can be separated by connecting two boundary reference pixels including a first boundary reference pixel that is a pixel in a background region closest to the contact point, and a second boundary reference pixel that is a pixel in a background region in a direction opposite to the first boundary reference pixel across the contact point.

20 Claims, 17 Drawing Sheets

(51) Int. Cl.
*G06V 10/26* (2022.01)
*G06V 10/60* (2022.01)
*G06V 10/764* (2022.01)
*G06V 10/98* (2022.01)

(52) U.S. Cl.
CPC ............ *G06V 10/764* (2022.01); *G06V 10/98* (2022.01); *G06T 2207/30242* (2013.01)

(56) References Cited

OTHER PUBLICATIONS

Jung, Chanho, and Changick Kim. "Segmenting clustered nuclei using H-minima transform-based marker extraction and contour parameterization." IEEE transactions on biomedical engineering 57, No. 10 (2010): 2600-2604. (Year: 2010).*
International Search Report and Written Opinion of the International Searching Authority mailed Apr. 21, 2020 for PCT Application No. PCT/JP2020/004529 along with English Translation of ISR.

* cited by examiner

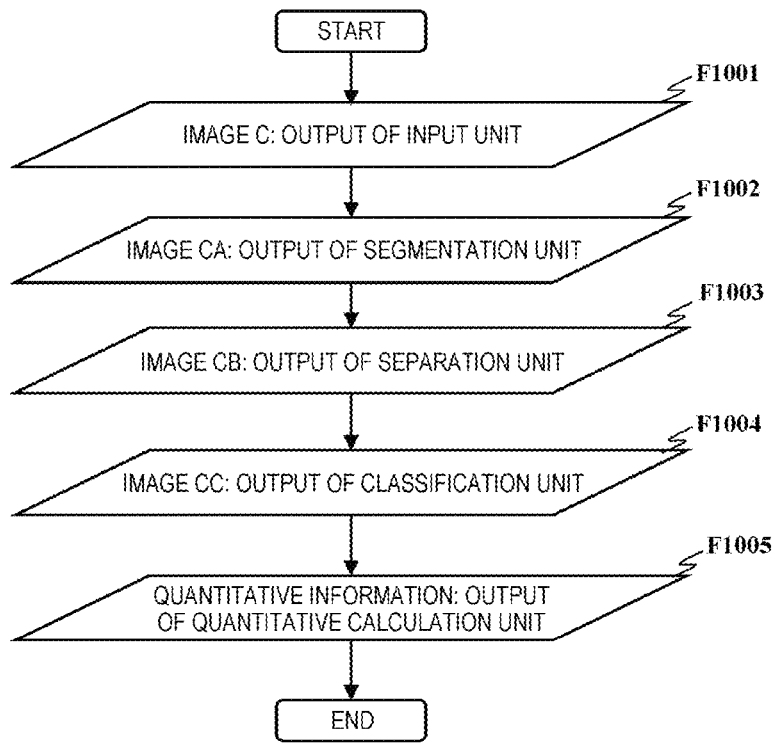
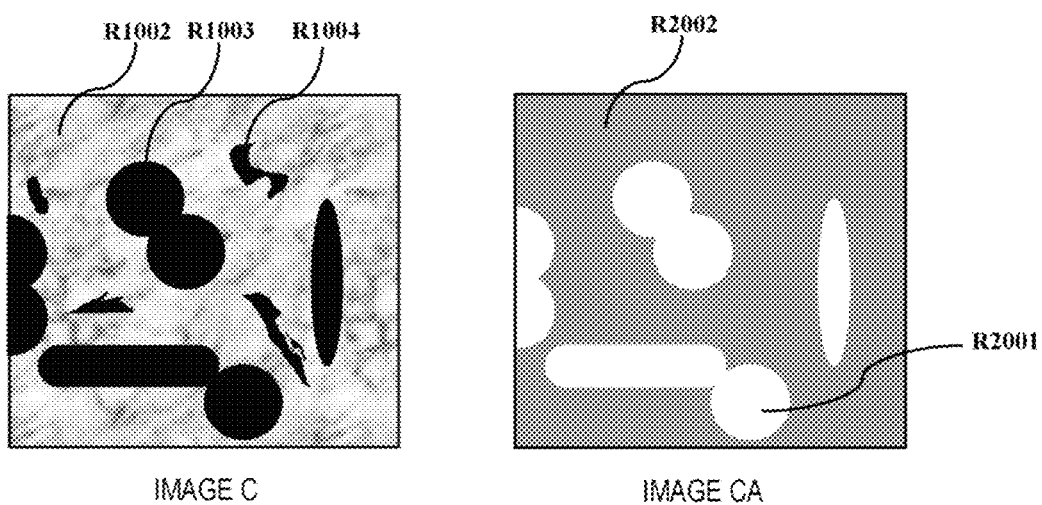

IMAGE CA — R3000

IMAGE CB — R3001

B2001

FIG. 11
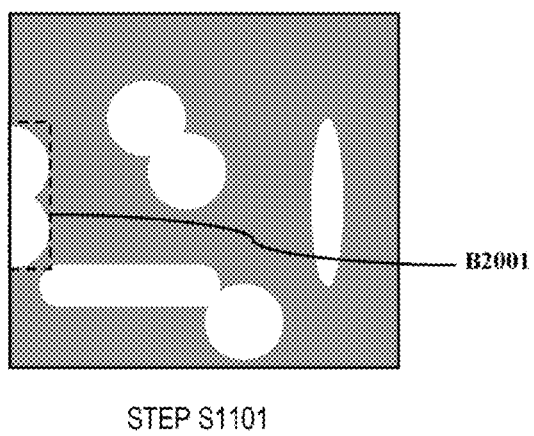
STEP S1101
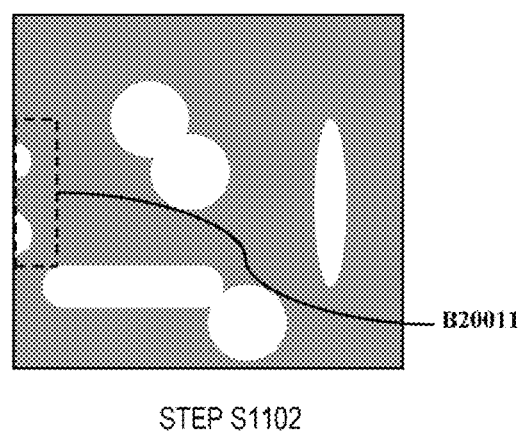
STEP S1102
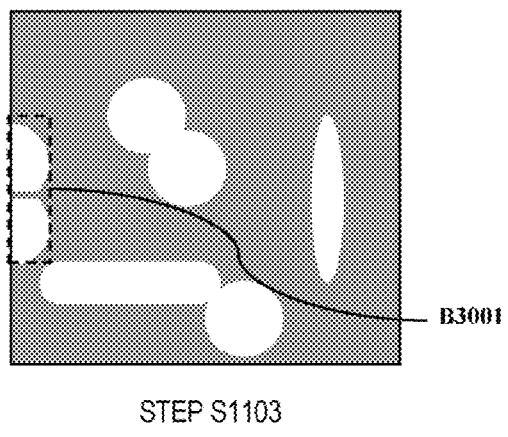
STEP S1103

IMAGE CB          IMAGE CC

DESCRIPTION

IMAGE PROCESSING METHOD, IMAGE PROCESSING APPARATUS, AND IMAGE PROCESSING SYSTEM

1. FIELD OF THE INVENTION

The present invention relates to an image processing method, an image processing apparatus, and an image processing system.

2. DESCRIPTION OF THE RELATED ART

In recent years, with a progress of adoption of IT, a large number of sensors are provided in society, and a fairly large amount of data is accumulated. Under such circumstances, various measures effectively utilizing accumulated image data have been studied. In particular, as a video content such as a photograph, a moving image, and an image increases, there is an increasing need for freely specifying an object in the video and extracting quantitative information on the specified object.

In related art, as one of methods for quantitative analysis of objects in an image, there has been a method for counting the number of objects in a set of objects with high homogeneity.

For example, U.S. Pat. No. 5,671,290 (PTL 1) discloses a technique of "counting, with respect to an image including at least one set of objects having high homogeneity, the number of objects included in the set based on distances from each point on a contour of the set to a mass center of the set, or estimating, with respect to an image including at least one set of objects having high homogeneity and at least one isolated object, the number of objects included in the set of objects based on a size of the isolated object".

PRIOR ART LITERATURE

Patent Documents

Patent document 1: U.S. Pat. No. 5,671,290

OVERVIEW OF THE INVENTION

Challenges that Inventions Seek to Solve

In order to quantitatively analyze an object in an image, it is important to accurately identify the object. For example, when an object similar to target objects is included in a background of an image, it is desirable to distinguish the target objects (foreground) and the background, classify the target objects that are the foreground for each class, and quantitatively analyze the number, a ratio, and the like of the target objects for each class, but any of the above patent literature does not describe a method capable of accurately classifying target objects.

Therefore, an object of the invention is to provide a method that separates plural objects in contact with each other in an image to accurately identify the objects and enable quantitative analysis of the identified objects. Here, the expression "in contact with each other" means that some of the plural objects are in contact with each other, partially overlap with each other, or occupy a same space.

How to Solve Your Challenges

To solve the above problem, according to an aspect of the invention, provided is an image processing apparatus including an input unit configured to input an image, a segmentation unit configured to segment a foreground and a background of the image, a separation unit configured to separate plural objects in contact with each other in the image, a classification unit configured to classify the objects into classes, and a quantitative calculation unit configured to generate quantitative information on the object.

Effect of Invention

According to the invention, it is possible to provide a method that separates the plural objects in contact with each other in an image to accurately identify the objects and enable quantitative analysis of the identified objects.

BRIEF DESCRIPTION OF THE DRAWINGS

FIG. 3 is a diagram showing intermediate output data according to the invention.

FIG. 4 is a diagram showing an example of an operation performed by a segmentation unit according to the first embodiment of the invention.

FIG. 11 is a diagram showing an example of a process for separating border objects in contact with each other according to the first embodiment of the invention.

DESCRIPTION OF THE PREFERRED EMBODIMENTS

Figure 1:
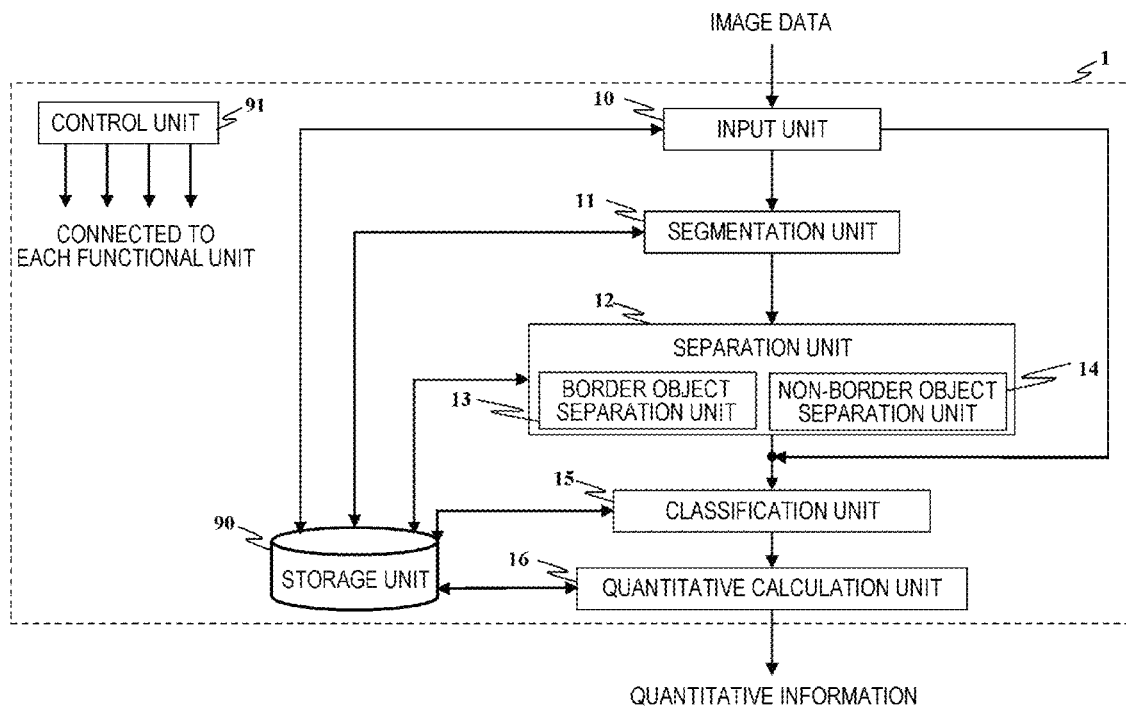
FIG. 1 is a block diagram showing a functional configuration of an image processing apparatus according to a first embodiment of the invention.

Hereinafter, embodiments of the invention will be described with reference to the drawings. The invention is not limited to these embodiments. Further, in the description of the drawings, the same parts are designated by the same reference numerals.

(Outline of Invention)

In an image for analysis, a target object to be analyzed may be shown together with an object unnecessary for analysis. However, in order to accurately calculate quantitative information on the target object, it is necessary to separate the target object and the unnecessary object. Separating a target object and an object other than the target object can be easily performed manually, but when it is necessary to process several thousand or several millions or more of images in a short time, it is desirable to automate this process. Therefore, it is necessary to automatically detect a target object in an image and exclude an unnecessary object.

Therefore, according to the embodiments of the invention described below, it is possible to accurately detect an object appearing as a foreground in an image, separate plural objects in contact with each other into independent objects, classify the separated objects for each class category, and then perform accurate quantitative analysis.

The invention is particularly effective for identification, separation, and analysis of an object formed from a continuous curved surface in a two-dimensional or three-dimensional space, such as a circle or a sphere. The term "circle" or "sphere" used herein is not limited to an object having a geometrically accurate "circle" or "sphere" shape, and includes an elliptical shape, an oval shape, and a cross section thereof. Further, the invention is not limited to the circle shape, the sphere shape, or the like, and processes described in the invention are effective as long as the object constitutes a closed space.

In the following drawings, a two-dimensional object is shown for convenience of explanation, but the invention is not limited thereto.

Next, an outline of a process according to the invention will be described.

First, an image including a target object and an unnecessary object is input to an image processing apparatus including a segmentation unit, a separation unit, a classification unit, and a quantitative calculation unit. The segmentation unit segments the input image into a foreground portion including the target object and a background portion including the unnecessary object. Next, the separation unit separates plural objects in contact with each other in the foreground by a process to be described later. Then, the classification unit classifies the separated objects for each class. Next, the quantitative calculation unit performs quantitative analysis on the classified objects to generate and provide quantitative information on the classified objects.

In addition, when the foreground and the background of the image are segmented, since the color and the texture of the foreground are similar to those of the background, a foreground region (incorrect background region), which is determined as the background, may be generated. When an incorrect background region is present in an image, it is potential that an accurate image analysis result cannot be obtained, and thus, in a second embodiment of the invention, an apparatus and a method for providing a more accurate quantitative analysis result by specifying and correcting an incorrect background region generated in an image will be described.

First Embodiment

First, a functional configuration of an image processing apparatus 1 according to a first embodiment of the invention will be described with reference to FIG. 1.

FIG. 1 is a block diagram showing the functional configuration of the image processing apparatus 1 according to the first embodiment of the invention.

As shown in FIG. 1, the image processing apparatus 1 includes an input unit 10, a segmentation unit 11, a separation unit 12, a classification unit 15, a quantitative calculation unit 16, a storage unit 90, and a control unit 91. The separation unit 12 further includes a border object separation unit 13 and a non-border object separation unit 14. The functional units constituting the image processing apparatus 1 may be implemented as, for example, a software module or may be implemented as independent dedicated hardware.

The input unit 10 is a functional unit that receives an input of an image for analysis (hereinafter, also referred to as an original image or an input image). This image may be an image acquired by an imaging device (not illustrated) directly connected to the image processing apparatus 1, or may be an image acquired via an information communication network such as the Internet. The input image may be a still image or an image obtained by extracting any frame in a moving image. When the image is a still image, the input unit 10 can receive a still image in any data format such as JPEG, JPEG 2000, PNG, or BMP. When the image is a moving image, the input unit 10 can receive a moving image in any data format such as Motion JPEG, MPEG, H.264, and HD/SDI.

The segmentation unit 11 is a functional unit that segments a foreground and a background of an input image. Here, the "foreground" means a region occupied by a target object in an image, and the "background" means a region other than the region occupied by the target object in the image. The segmentation unit 11 outputs an image that are segmented into a foreground including a target object and a background including an unnecessary object by using any method such as a background difference, a median filter, a binarization process, and a convolutional neural network.

Here, the "segmented" means that the background and the foreground of the image are distinguished. Specifically, the segmentation unit may distinguish between the background and the foreground of the image by attaching, to a pixel belonging to the background (hereinafter referred to as a background pixel) and a pixel belonging to the foreground (hereinafter referred to as a foreground pixel), metadata indicating whether a corresponding pixel is the background pixel or the foreground pixel, as a label.

The separation unit 12 is a functional unit that separates plural objects identified as a single object (for example, there are objects that are originally two objects, but the two objects are identified as one object since these the two objects are in contact with each other) in the image output by the segmentation unit 11. By using the separation unit 12, the plural objects in contact with each other can be separated into individual independent objects, and quantitative analysis can be smoothly performed on the objects in the image.

In addition, in an image, there may be a "border object" in which a part of the object is present outside the image, and a "non-border object" in which the entire object is present in the image.

Figure 6:
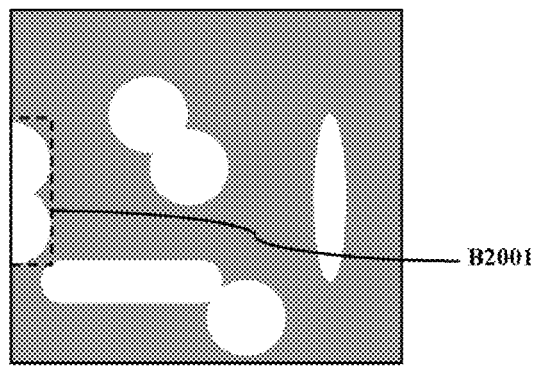
FIG. 6 is a diagram showing an example of a border object.
Figure 8:
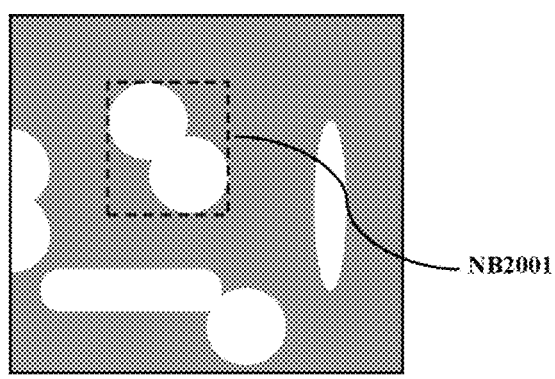
FIG. 8 is a diagram showing an example of a non-border object.

FIG. 6 shows an example of the border object, and FIG. 8 shows an example of the non-border object. As shown in a border object B2001 in FIG. 6, plural objects in which a part of the objects is present outside the image and which are in contact with each other are referred to as the border object in the present disclosure. As shown in a non-border object NB2001 in FIG. 8, plural objects in which the entire object is present in the image and which are in contact with each other are referred to as the non-border object in the present disclosure.

A method for separating an object is different depending on whether the object is a border object or a non-border object. Therefore, as shown in FIG. 1, the separation unit 12 includes the border object separation unit 13 for separating the border object and the non-border object separation unit 14 for separating the non-border object. Processing of these functional units will be described later.

The classification unit 15 is a functional unit for classifying objects belonging to the foreground for each class. The classification unit 15 may classify objects by using, for example, a linear classifier such as Fisher's linear discriminant analysis, logistic regression, or linear support vector machine, a quadratic classifier, K-nearest neighbors algorithm, a neural network, or a nonlinear method such as a Bayesian network.

The quantitative calculation unit 16 is a functional unit that calculates and provides quantitative information on a target object. Here, the quantitative information may be the number of objects (the number of oranges is 10 and the number of apples is 5), a ratio between objects in classes (2:1), a proportion, or the like, but is not limited thereto.

The storage unit 90 is a memory that stores inputs, outputs, and intermediate results (for example, output data shown in FIG. 3) of each functional unit of the image processing apparatus 1. Each functional unit of the image processing apparatus 1 can store data in the storage unit 90 or read data from the storage unit 90 as necessary. The storage unit 90 may be any storage medium such as a flash memory or a hard disk drive.

The control unit 91 is a functional unit that is connected to each functional unit of the image processing apparatus 1 described above and controls operations of each functional unit. The control unit 91 may manage, for example, access permission between the functional units, data communication, commands from a CPU, and the like.

In FIG. 1, the configuration including the control unit 91 is shown as an example, but the invention is not limited thereto, and a configuration in which each functional unit autonomously operates may be adopted.

Next, a hardware configuration of the image processing apparatus 1 will be described with reference to FIG. 2.

Figure 2:
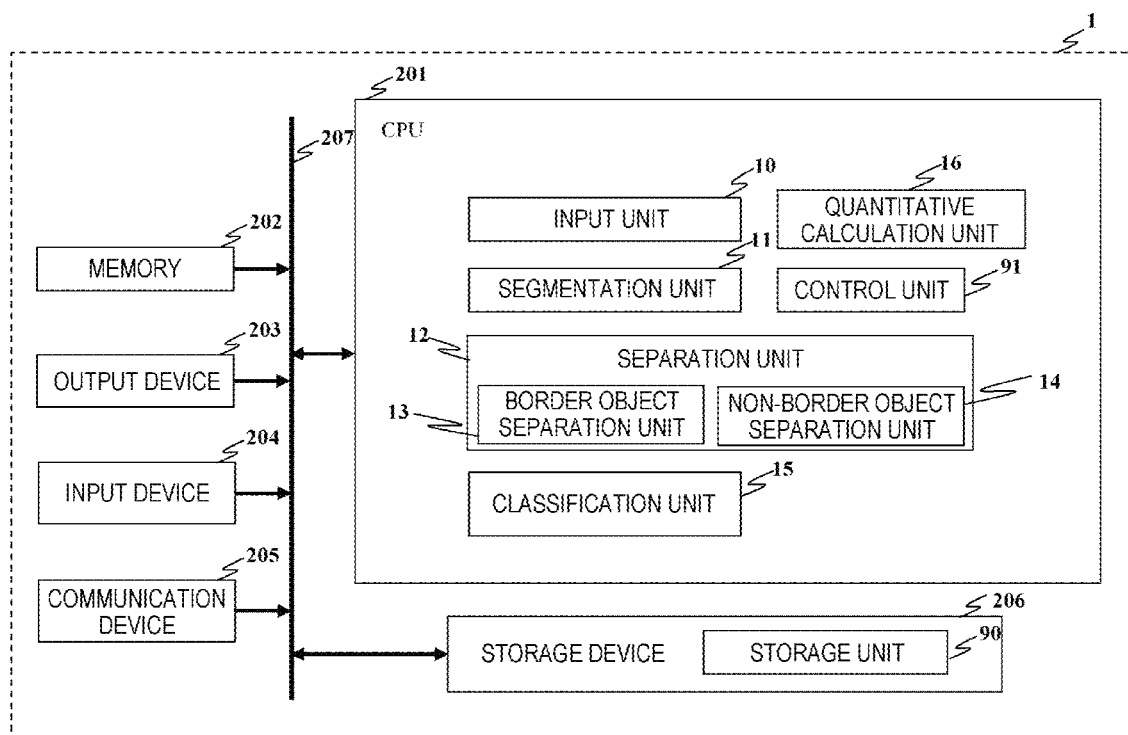
FIG. 2 is a block diagram showing an example of a hardware configuration of the image processing apparatus according to the first embodiment of the invention.

FIG. 2 is a block diagram showing an example of the hardware configuration of the image processing apparatus 1 according to the first embodiment of the invention. As shown in FIG. 2, the image processing apparatus 1 includes a CPU 201, a memory 202, a storage device 206, an output device 203, an input device 204, and a communication device 205. These devices are connected to each other by a bus 207.

Since the input unit 10, the segmentation unit 11, the separation unit 12, the border object separation unit 13, the non-border object separation unit 14, the classification unit 15, the quantitative calculation unit 16, the storage unit 90, and the control unit 91 are the same as those in FIG. 1, the description thereof will be omitted.

The CPU 201 is a processor that reads various programs stored in the memory 202 as necessary and executes processes according to commands from the programs. For example, the functions of the input unit 10, the segmentation unit 11, the separation unit 12, the classification unit 15, and the quantitative calculation unit 16 in FIG. 1 may be implemented by the processes executed by the CPU 201.

The storage device 206 is a device that stores various types of data used for each functional unit of the image processing apparatus 1, and is a device corresponding to the storage unit 90 in FIG. 1. The storage device 206 may store, for example, an input image, an image in which a foreground and a background are segmented, an image in which objects in contact with each other are separated, and an image in which objects are classified into classes. Image data used in past image processes and quantitative information calculation results may also be stored in the storage device 206.

The output device 203 is a device that outputs a result of quantitative analysis calculated by processes of the invention and various images generated in each unit. The output device may be, for example, a device such as a display, a printer, or a speaker. For example, when a display is used as the output device 203, an image segmented by the segmentation unit 11, an image in which the target object is separated by the separation unit 12, an image in which the target object is classified by the classification unit 15, and quantitative information on the target object that is generated by the quantitative calculation unit 16 are displayed on a graphic user interface (GUI) on a screen.

The input device 204 is a device for inputting an instruction or the like by a user. The input device is, for example, a device such as a keyboard, a mouse, or a microphone. A user who uses the image processing apparatus 1 may select, for example, an image to be processed via the input device 204.

The communication device 205 is a device for communicating with an external device (not shown). For example, the communication device 205 may receive an image transmitted from an external imaging device, a camera, or a server via a communication network such as the Internet or a LAN.

The configuration in which the communication device 205 is incorporated in the image processing apparatus 1 is shown as an example, but the invention is not limited thereto, and a configuration in which the communication device 205 is disposed outside and is connected to the image processing apparatus 1 can also be applied. Therefore, the communication device 205 is not necessarily included as a hardware component of the image processing apparatus 1.

Next, intermediate output data in the invention will be described with reference to FIG. 3.

FIG. 3 is a diagram showing the intermediate output data generated by each functional unit in FIG. 1. An output F1001 of the input unit is an original image C input via the input unit, an output F1002 of the segmentation unit is an image CA in which a background and a foreground are segmented, an output F1003 of the separation unit is an image CB in which objects in contact with each other are separated, an output F1004 of the classification unit is an image CC in which the objects are classified into classes, and an output F1005 of the quantitative calculation unit is quantitative information derived for the object.

Details of these intermediate outputs will be described later. In the following description, an example of each image is illustrated, but this is merely an example for making the description easy to understand, and the output of the functional unit of the invention is not limited to the illustrated image.

Next, a process in which the segmentation unit (for example, the segmentation unit 11 shown in FIG. 1) segments the background and the foreground of the original image will be described with reference to FIG. 4.

As described above, in order to accurately calculate quantitative information on a target object shown in an image, it is necessary to separate an object to be analyzed and an object not to be analyzed. Therefore, when the original image C including the object to be analyzed is input via the input unit, the segmentation unit processes the input image C by using methods such as the background difference, the median filter, the binarization process, and the convolutional neural network, and outputs the image CA in which a foreground including the target object and a background including the unnecessary object are distinguished.

FIG. 4 is a diagram showing an example of an operation performed by the segmentation unit according to the first embodiment of the invention. The image C is an image input via the input unit. As shown in FIG. 4, the image C includes a background region R1002, an object R1003 occupying a foreground region, and an unnecessary object R1004. The segmentation unit processes the image C by using, for example, a segmenting method using the convolutional neural network to generate the image CA in which a foreground region R2001 and a background region R2002 are distinguished from each other. The image CA generated by the segmentation unit is stored in the storage unit 90.

The example in which the segmentation unit distinguishes the background region and the foreground region of the image C by using the convolutional neural network has been described above, but the invention is not limited thereto, and any method may be used as long as the background region and the foreground region can be distinguished from each other.

Next, with reference to FIGS. 5 to 18, a process in which the separation unit (for example, the separation unit 12 shown in FIG. 1) separates the objects in contact with each other will be described. With respect to the image CA output by the segmentation unit described above, the image CB is generated by the separation unit separating the objects in contact with each other.

Figure 5:
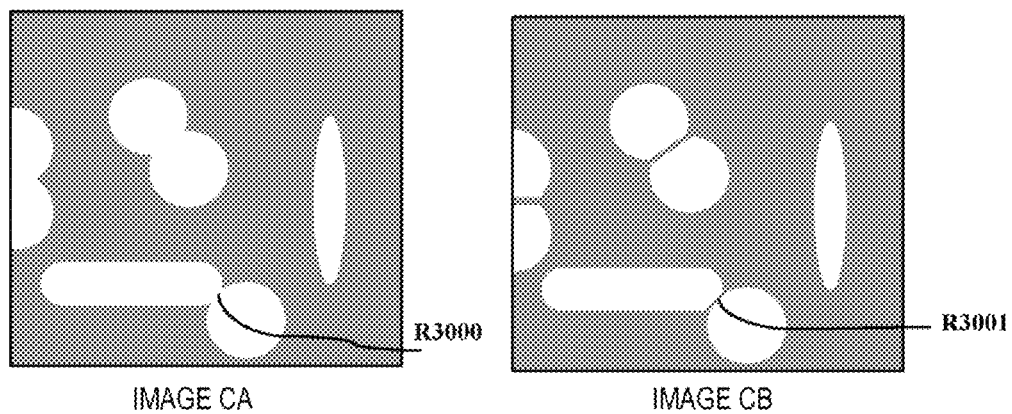
FIG. 5 is a diagram showing an example of an operation performed by a separation unit according to the first embodiment of the invention.

FIG. 5 is a diagram showing an example of an operation performed by the separation unit. As described above, the image CA is the output from the segmentation unit 11, and is in a state R3000 in which plural objects included in the foreground are in contact with each other. Even when the quantitative analysis is performed on the image in a state in which plural objects are in contact with each other, a good analysis result cannot be obtained, and thus, it is desirable to separate the objects in contact with each other. Therefore, the separation unit processes the image CA to separate the overlapping objects, so that it is possible to generate the image CB in which the respective objects are in an independent state R3001 as shown in the image CB.

As described above, the method for separating the objects is different depending on whether the object is a border object or a non-border object. Therefore, the separation unit is configured to determine whether the target object is a border object, and to perform an appropriate separation process depending on the type of the object.

FIG. 6 is a diagram showing an example of the border object. As described above, the border object is an object located near an edge of an image, and a part of the object exists outside the image. A border object B2001 in FIG. 6 is in a state in which plural objects (before separation) are in contact with each other.

Figure 7:
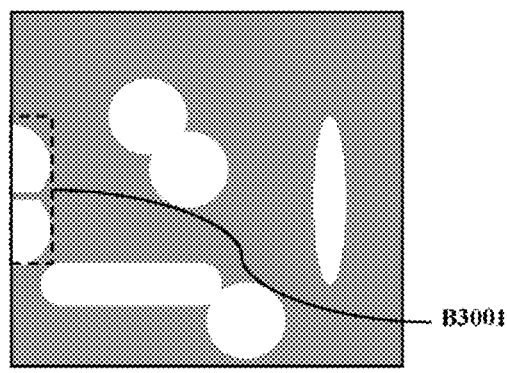
FIG. 7 is a diagram showing a state in which the border object is separated.

FIG. 7 is a diagram showing a state in which the border object is separated. By the separation unit separating the border object B2001 in contact with each other as shown in FIG. 6, the plural objects in contact with each other are separated as shown by a border object B3001 in FIG. 7.

FIG. 8 is a diagram showing an example of the non-border object. As described above, the non-border object is an object in which the entire object is contained in the image. A non-border object NB2001 in FIG. 8 is in a state in which plural non-border objects (before separation) are in contact with each other.

Figure 9:
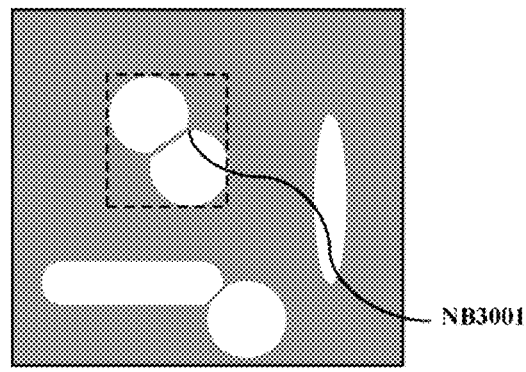
FIG. 9 is a diagram showing a state in which the non-border object is separated.

FIG. 9 is a diagram showing a state in which the non-border object is separated. By the separation unit separating the non-border object NB2001 in contact with each other as shown in FIG. 8, the plural objects in contact with each other are separated as shown by a non-border object NB3001 in FIG. 9.

Figure 10:
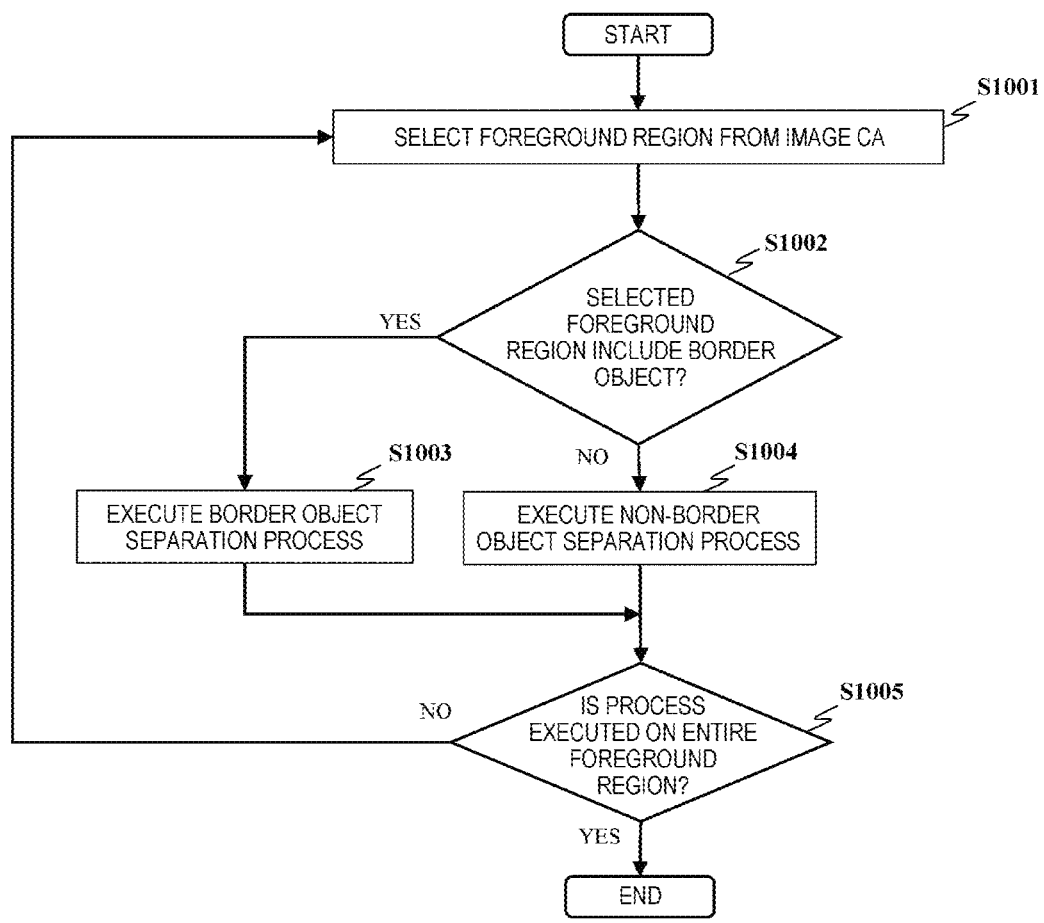
FIG. 10 is a flowchart showing a separation process according to the first embodiment of the invention.

FIG. 10 is a flowchart showing a separation process. The above-described separation unit determines whether the target object is the border object or the non-border object by executing the following process, and executes an appropriate separation process according to the type of the object.

First, in step S1001, from the image CA that is the output of the segmentation unit described above, the foreground region including the target object is selected. The foreground region may be selected, for example, based on an instruction input by the user via the input device (the input device 204 shown in FIG. 2), or a foreground region satisfying a selection condition (a condition for specifying a specific area, a color, a shape, or the like) set in advance may be automatically selected by the separation unit.

Next, in step S1002, the separation unit determines whether a border object is present in the selected foreground region. Here, the separation unit may determine whether a border object is present in the selected foreground region by, for example, executing the existing edge detection method or the like on the object included in the foreground region selected from the image to verify whether an edge of the object is in contact with an edge of the image. When the border object is present in the selected foreground region, the process proceeds to step S1003, and when the border object is not present in the selected foreground region, the process proceeds to step S1004.

Next, in step S1003, the separation unit executes a border object separation process, which will be described later, to separate the objects in contact with each other.

Next, in step S1004, the separation unit executes a non-border object separation process, which will be described later, to separate the objects in contact with each other.

Next, in step S1005, the separation unit determines whether the process is executed on the entire foreground region. When the process is not executed on the entire foreground region, the process returns to step S1001, and when the process is executed on the entire foreground region, the process ends.

Next, an example of the process for separating the border objects will be described with reference to FIG. 11. This border object separation process is, for example, a process corresponding to step S1003 in the flowchart shown in FIG. 10, and is a process performed by the border object separation unit 13 shown in FIG. 1.

First, in step S1101 of FIG. 11, the border object separation unit 13 selects a foreground region including the border object B2001 in contact with each other. As shown in FIG. 11, since the border object B2001 is present at the edge of the image, a part of the border object B2001 is hidden.

Next, in step S1102, the border object separation unit 13 generates a seed region B20011 of the plural objects constituting the border object B2001. Specifically, the border object separation unit 13 performs a so-called distance conversion process on the target foreground region. In the distance conversion process, a distance map in which a distance from each foreground pixel to a background pixel closest to the corresponding foreground pixel is expressed as a luminance value is generated.

In this distance map, the longer the distance from the foreground pixel to background pixel closest to the corresponding foreground pixel is, the higher the luminance value is, and thus, a luminance value of a center portion of the object distant from the background pixel is high, and a luminance value of a portion close to an edge of the object is low. In addition, in the distance conversion process, since the foreground pixel that does not reach a predetermined luminance value is set as the background, a region having a highest luminance value (that is, the center portion) remains as the so-called seed region B20011 in each object.

Next, in step S1103, the border object separation unit 13 can separate the border objects B2001 in contact with each other into individual objects B3001 by performing existing watershed conversion using the seed region generated in step S1102.

Next, the process for separating the non-border objects will be described with reference to FIG. 12 to FIG. 18. This non-border object separation process is, for example, a process corresponding to step S1004 in the flowchart shown in FIG. 10, and is a process performed by the non-border object separation unit 14 shown in FIG. 1.

Figure 12:
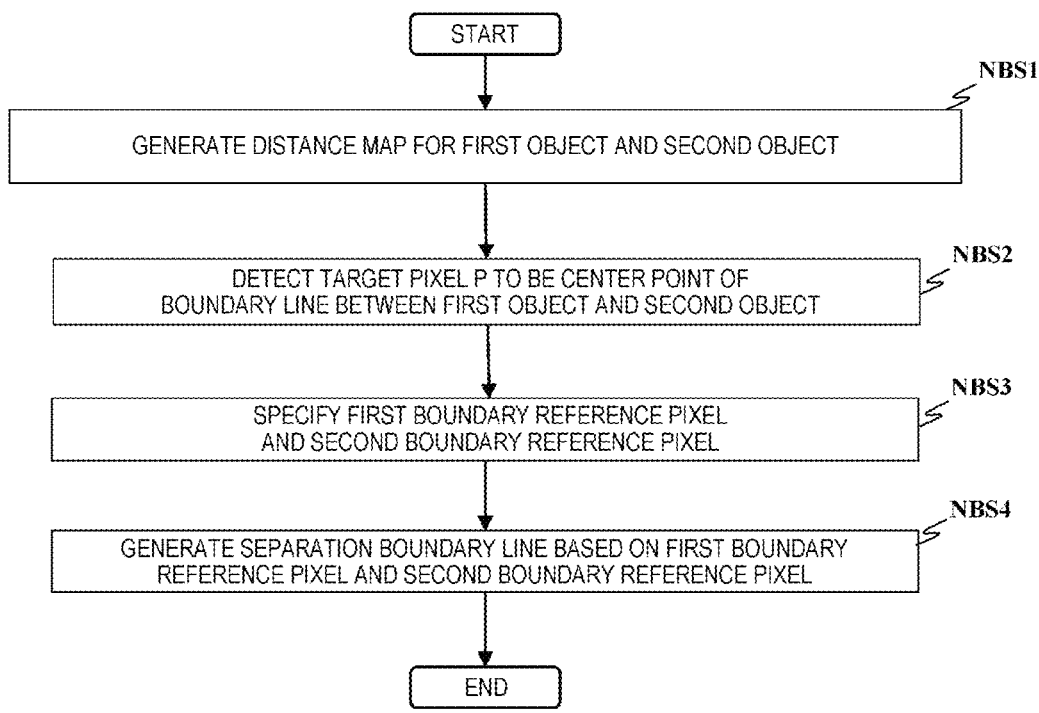
FIG. 12 is a flowchart showing a classification process according to the first embodiment of the invention.
Figure 13:
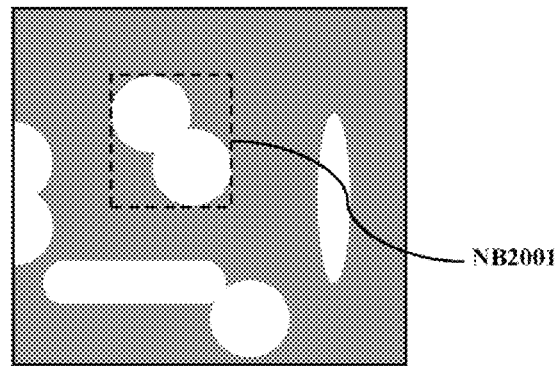
FIG. 13 is a diagram showing an example of non-border objects in contact with each other according to the first embodiment of the invention.

FIG. 12 is a diagram showing a flowchart of the process for separating the non-border objects.

Figure 14:
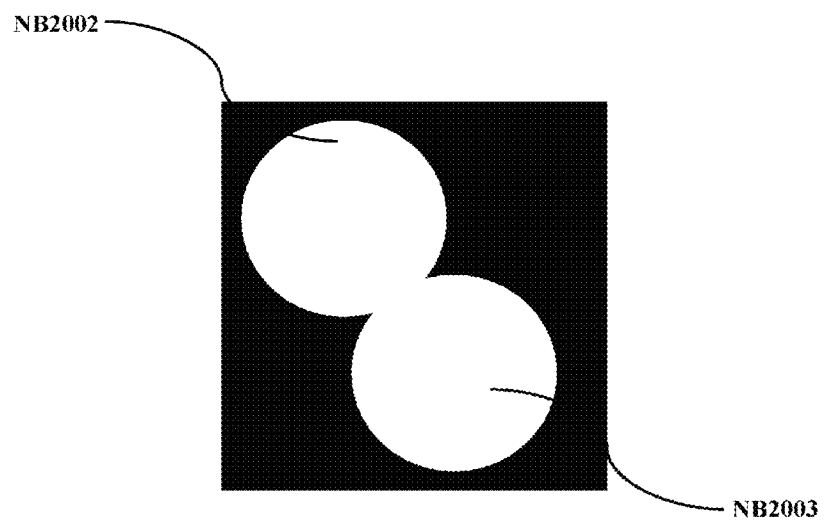
FIG. 14 is a diagram showing an enlarged state of the non-border objects in contact with each other shown in FIG. 13.

First, in step NBS1, the non-border object separation unit 14 selects a foreground region including the non-border object NB2001 in contact with each other in the image CA output from the segmentation unit described above (see FIG. 13). As shown in FIG. 14, the non-border object NB2001 is actually formed of a first object NB2002 and a second object NB2003.

Figure 15:
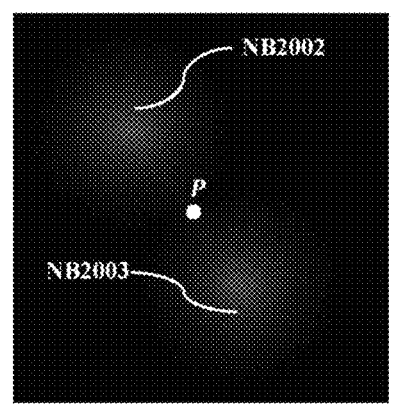
FIG. 15 is a diagram showing a state after a distance conversion process is performed on a first object and a second object.

After the non-border object NB2001 in contact with each other is selected, the non-border object separation unit 14 applies the distance conversion process to the first object NB2002 and the second object NB2003 constituting the selected non-border object NB2001 in the same manner as in step S1102 of FIG. 11. As described above, in the distance conversion process, a distance map is generated, in which distances from the pixels belonging to the first object NB2002 and the second object NB2003 to the background pixels closest to the foreground pixels are expressed as luminance values, respectively. In this distance map, the longer the distance from the foreground pixel to background pixel closest to the corresponding foreground pixel is, the higher the luminance value is, and thus, a luminance value of a center portion of each of the first object NB2002 and the second object NB2003 that is distant from the background is high, and a luminance value of a portion close to an edge of the object is low. FIG. 15 is a diagram showing a state after the distance conversion is performed on the first object NB2002 and the second object NB2003.

Next, in step NBS2, the non-border object separation unit 14 specifies a target pixel P to be a center point of a boundary line between the first object NB2002 and the second object NB2003. In order to specify the target pixel P, the non-border object separation unit 14 determines a first axis (X axis) and a second axis (Y axis) orthogonal to each other for each pixel of the distance map of the first object NB2002 and the second object NB2003, and verifies whether a luminance value of a pixel $P_{RV}$ separated by a predetermined distance m (not shown) along a positive direction of the X axis and a luminance value of a pixel $P_{LV}$ separated by the predetermined distance m (not shown) along a negative direction of the X axis are less than a luminance value of the pixel P, and whether a luminance value of a pixel $P_{TV}$ separated by a predetermined distance n (not shown) along a positive direction of the Y axis and a luminance value of a pixel $P_{BV}$ separated by the predetermined distance n (not shown) along a negative direction of the Y axis are equal to or more than the luminance value of the pixel P (see FIG. 16).

When the target pixel P satisfying these conditions is detected, the process proceeds to step NBS3, and when the target pixel P satisfying these conditions is not detected, the non-border object separation unit 14 changes angles of the first axis and the second axis and repeats the above processing. This processing is repeatedly performed for all angles of 360 degrees around each pixel of the distance map between first object NB2002 and second object NB2003 until the target pixel P is specified or the above processing is applied to all pixels and angles.

In the above processing, the target pixel P is specified by verifying a luminance of a specific pixel ($P_{RV}$, $P_{LV}$, $P_{TV}$, $P_{BV}$), but the invention is not limited thereto, and it is also possible to verify luminance values of all pixels within a predetermined distance range from the first axis and the second axis.

Next, in step NBS3, the non-border object separation unit 14 specifies a first boundary reference pixel and a second boundary reference pixel, which are both ends of a separation boundary line for separating the first object NB2002 and the second object NB2003.

Hereinafter, details of the processing of specifying a first boundary reference pixel $P_R$ described above will be described.

First, in order to specify the first boundary reference pixel $P_R$, the non-border object separation unit 14 calculates, based on the luminance value of the pixel P, a distance d from the pixel P to a closest background pixel in the positive direction of the first axis determined to have low luminance in the above-described processing, and then calculates a distance $d_N$ from the pixel P to the first boundary reference pixel $P_R$ along the positive direction of the first axis based on the distance d and a predetermined offset b. Here, $d_N$ is obtained by the following equation.

$$d_N = d + b \quad (1)$$

Next, in order to specify the first boundary reference pixel $P_R$, the non-border object separation unit 14 verifies whether the pixel $P_R$ along the positive direction of the first axis (that is, the X axis that is an axis formed of pixels having low luminance values in the distance map) from the target pixel P satisfies the following a, b, and c.
  a) The pixel $P_R$ is a background pixel (pixel having a luminance value of 0)
  b) A pixel present in the positive direction (first reference pixel $P_{R1}$) is a background pixel
  c) The first object and the second object are present in the positive direction and the negative direction of the second axis, and distances from the boundary reference pixel $P_R$ to the first object and the second object are within a predetermined distance reference a (for example, 5 pixels)

Figure 16:
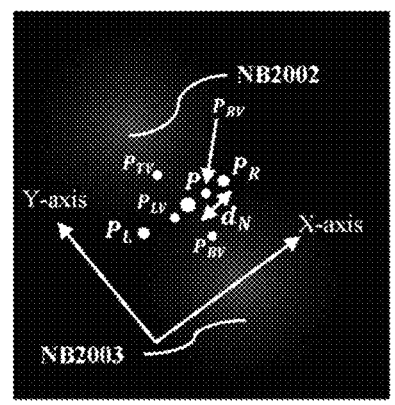
FIG. 16 is a diagram illustrating a process of specifying a target pixel P that is a center point of a boundary line between the first object and the second object.
Figure 17:
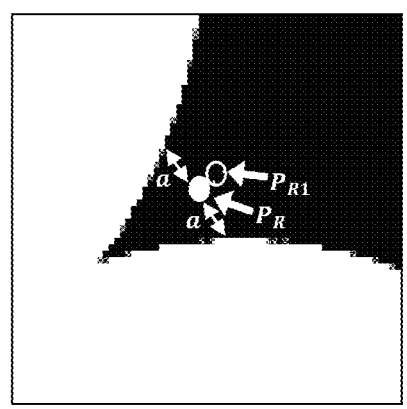
FIG. 17 is a diagram illustrating a process of specifying a boundary reference pixel.
Figure 18:
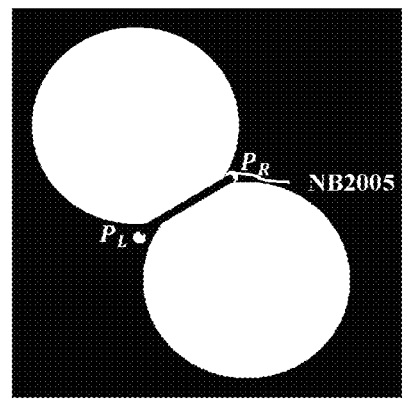
FIG. 18 is a diagram showing a state in which the first object and the second object are separated from each other.

When a pixel satisfying these conditions is specified, the non-border object separation unit 14 sets the specified pixel as the first boundary reference pixel $P_R$ (see FIGS. 16 and 17).

The first reference pixel $P_{R1}$ may be a pixel adjacent to the first boundary reference pixel $P_R$.

Similarly, in order to specify the second boundary reference pixel $P_L$, the non-border object separation unit 14 calculates, based on the luminance value of the pixel P, a distance d from the pixel P to a closest background pixel in the negative direction of the first axis determined to have low luminance in the above-described processing, and then calculates a distance $d_N$ from the pixel P to the second boundary reference pixel $P_L$ along the negative direction of the first axis based on the distance d and a predetermined offset b. Here, $d_N$ is obtained by the above Equation (1).

Next, in order to specify the second boundary reference pixel $P_L$, the non-border object separation unit 14 verifies whether the pixel $P_L$ along the negative direction of the first axis (that is, the X axis which is an axis formed of pixels having low luminance values) from the target pixel P satisfies the following a, b, and c.
  a) The pixel $P_L$ is a background pixel (pixel having a luminance value of 0)
  b) A pixel present in the negative direction (second reference pixel $P_{L1}$, not shown) is a background pixel
  c) The first object and the second object are present in the positive direction and the negative direction of the second axis, and distances from the boundary reference pixel $P_L$ to the first object and the second object are within a predetermined distance reference a (for example, 5 pixels)

When a pixel satisfying these conditions is specified, the non-border object separation unit 14 sets the specified pixel as the second boundary reference pixel $P_L$ (see FIGS. 16 and 17).

The second reference pixel $P_{L1}$ may be a pixel adjacent to the second boundary reference pixel $P_L$.

Next, in step NBS4, the non-border object separation unit 14 generates a separation boundary line NB2005 based on the first boundary reference pixel and the second boundary reference pixel. Specifically, the non-border object separation unit 14 may generate a line segment that passes through the target pixel P and connects the first boundary reference pixel $P_R$ and the second boundary reference pixel $P_L$, and set the line segment as the separation boundary line (see FIG. 18). As a result, contours of the first object NB2002 and the second object NB2003 become clear, so that accuracy of identifying and classifying each object in a classification process to be described later is improved.

After the separation boundary line is generated, the non-border object separation unit 14 generates the image CB in which the first object NB2002 and the second object NB2003 are separated along the separation boundary line NB2005. By supplying the image CB to a classification unit to be described later, the objects (for example, the first object NB2002 and the second object NB2003) shown in the image CB can be classified into a category to which the objects belong.

By verifying whether distances from $P_R$ and $P_L$ to the first object and the second object are within the predetermined distance reference a, the separation boundary line is generated at an appropriate position, so that the plural contacted objects can be segmented.

By performing the non-border object separation process described above, the contacted objects can be separated into individual independent objects, thereby improving the accuracy of the classification processing and quantitative analysis to be described later.

The process for separating non-border objects described above is merely an example, and other methods may be used as long as the method can separate overlapping non-border objects.

Next, a classification process according to the invention will be described with reference to FIGS. 19 and 20. As described above, by the classification unit according to the invention processing the image in which the objects in contact with each other are separated, the objects shown in the image can be classified into classes.

Figure 19:
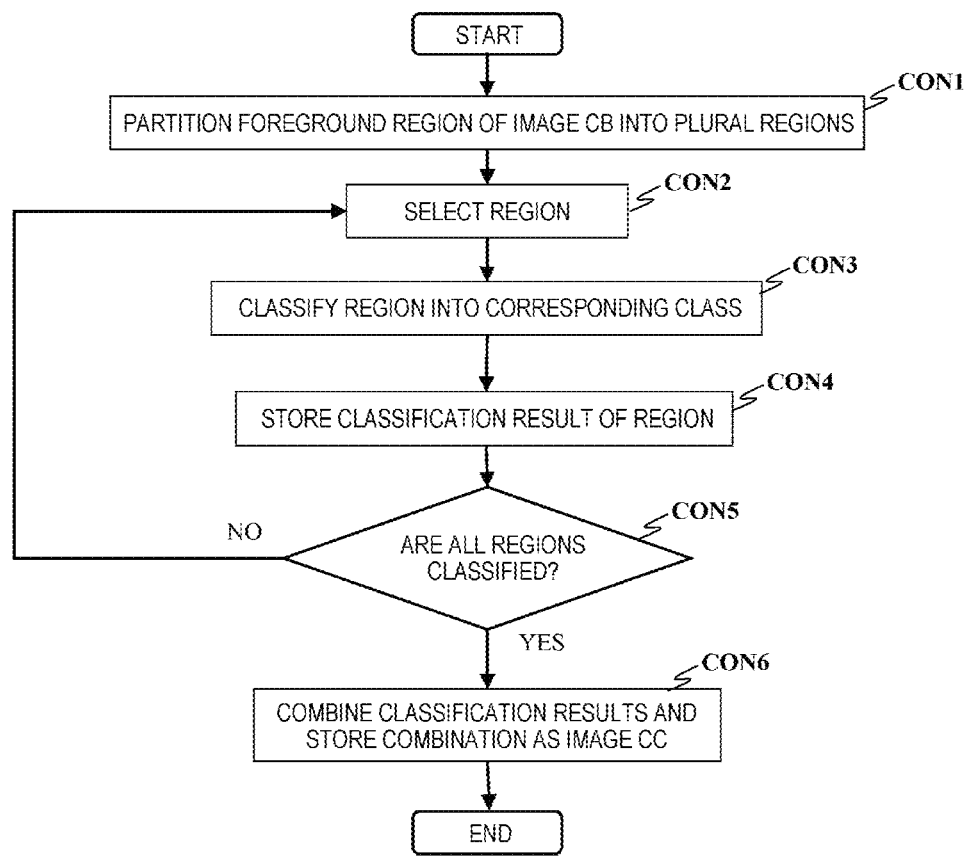
FIG. 19 is a flowchart showing a classification process according to the first embodiment of the invention.

FIG. 19 is a flowchart showing the classification process according to the invention.

First, in step CON1, the classification unit (for example, the classification unit 15 shown in FIG. 1) partitions the foreground of the image CB in which the first object and the second object are separated along the separation boundary line into plural regions. Here, the meaning of "partition" includes segmenting, partitioning, and grouping the image CB into plural regions. In an image partition process, the target image may be divided into, for example, grid patches having an equal area. A size of the patch is appropriately determined according to the number of pixels or complexity of the target image, a memory restriction of the image processing apparatus, or the like.

Next, in step CON2, the classification unit selects any region (or plural adjacent regions) from the partitioned regions.

Next, in step CON3, the classification unit determines a class corresponding to the selected region by using a classification method such as a convolutional neural network, a principal component analysis, or t-distributed stochastic neighbor embedding (t-SNE). Here, the class is a type (category) that defines an object included in the selected region. As an example, the class may be, for example, a label for determining an object shown in the selected region.

In step CON4, the classified region is stored in the storage unit (for example, the storage unit 90 shown in FIG. 1).

Next, in step CON5, the classification unit confirms whether all the regions in the image are classified. When all the regions are classified, the process proceeds to step CON6, and when not all the regions are classified, the process returns to step CON2.

Next, in step CON6, the classification unit combines classification results for the regions and outputs the combination as the image CC.

Figure 20:
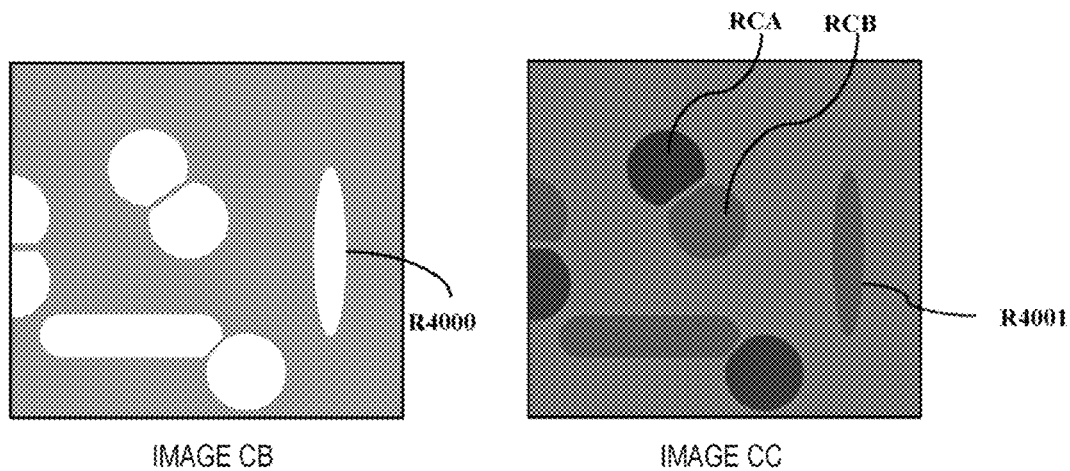
FIG. 20 is a diagram showing an example of an operation performed by a classification unit according to the first embodiment of the invention.

FIG. 20 is a diagram showing an example of an operation performed by the classification unit according to the invention. The image CB shown in FIG. 20 is an image in which plural objects in contact with each other are separated into individual independent objects. For example, since an object R4000 of the image CB is not yet classified, it is unknown which class the object R4000 belongs to. By the classification unit described above processing such an image CB, it is possible to generate the image CC in which the objects are classified into the respective classes.

For example, as shown in the image CC, the objects of the image CB are divided into two different classes (indicated by different colors) of RCA and RCB, and the object R4001 is classified into the class of RCB. By the quantitative calculation unit to be described later processing such an image CC in which the objects are classified into the classes, quantitative information on the objects can be derived.

By classifying the objects of the image into the classes in such a manner, the objects having similar features can be classified into similar categories, and quantitative analysis for each category related to the objects can be performed.

Next, a process of quantitative analysis performed on an object according to the invention will be described with reference to FIG. 21.

Figure 21:
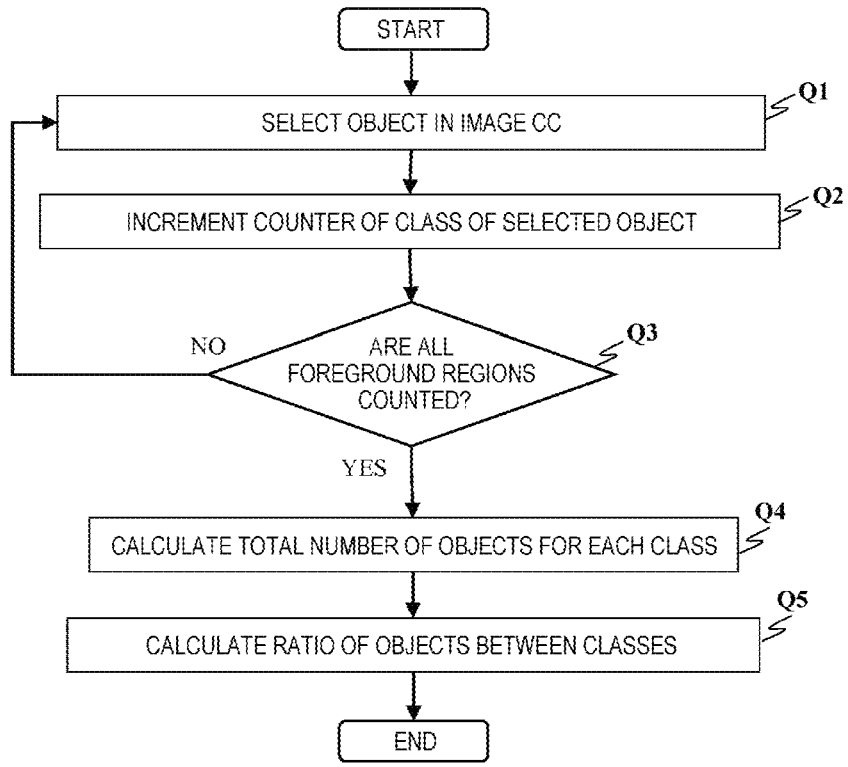
FIG. 21 is a diagram showing an example of a process of quantitative analysis according to the first embodiment of the invention.

FIG. 21 is a diagram showing an example of the process of quantitative analysis. As described above, the image CC in which the background and the foreground are segmented, the objects in contact with each other are separated, and the objects are classified into the classes is processed by the quantitative calculation unit (for example, the quantitative calculation unit 16 shown in FIG. 1) according to the invention, so that quantitative information on the objects can be derived.

Here, an example of calculating the number of objects and a ratio of objects between the classes will be described as the quantitative information on the objects, but the invention is not limited thereto, and other quantitative information can also be generated.

First, in step Q1, the quantitative calculation unit selects one object (that is, a region including connected foreground regions) in the image CC.

Next, in step Q2, the quantitative calculation unit specifies the class of the selected object based on the result (for example, a label attached to the object of the image CC) of the classification unit for the class of the selected object, and increments a counter of this class.

Next, in step Q3, the quantitative calculation unit confirms whether all the foreground regions (that is, objects) in the image CC are counted. When all the foreground regions are counted, the process proceeds to step Q4, and when not all the foreground regions are counted, the process proceeds to step Q1.

In step Q4, the quantitative calculation unit calculates a total number of objects for each class.

In step Q5, the quantitative calculation unit calculates quantitative information (for example, the number of objects for each class and the ratio of objects between classes) calculated for the object of the image. The calculated quantitative information may be stored in, for example, a storage unit (for example, the storage unit 90 shown in FIG. 1), may be provided to a user using a display device, or may be transmitted to another functional unit or an external device for further calculation of the object.

According to the first embodiment described above, by separating the plural objects in contact with each other in an image, it is possible to accurately classify the objects and to perform quantitative analysis on the classified objects.

Second Embodiment

Next, a second embodiment according to the invention will be described with reference to FIGS. 22 to 27.

As described above, when the foreground and the background of the image are segmented, since the color and the texture of the foreground are similar to those of the background, a foreground region (incorrect background region) that is determined as the background may be generated. When the incorrect background region is present in an image, it is potential that the image cannot be accurately analyzed, and thus, the second embodiment of the invention enables accurate quantitative analysis by specifying and correcting the incorrect background region generated in the image.

First, a functional configuration of an image processing apparatus according to the second embodiment of the invention will be described with reference to FIG. 22.

Figure 22:
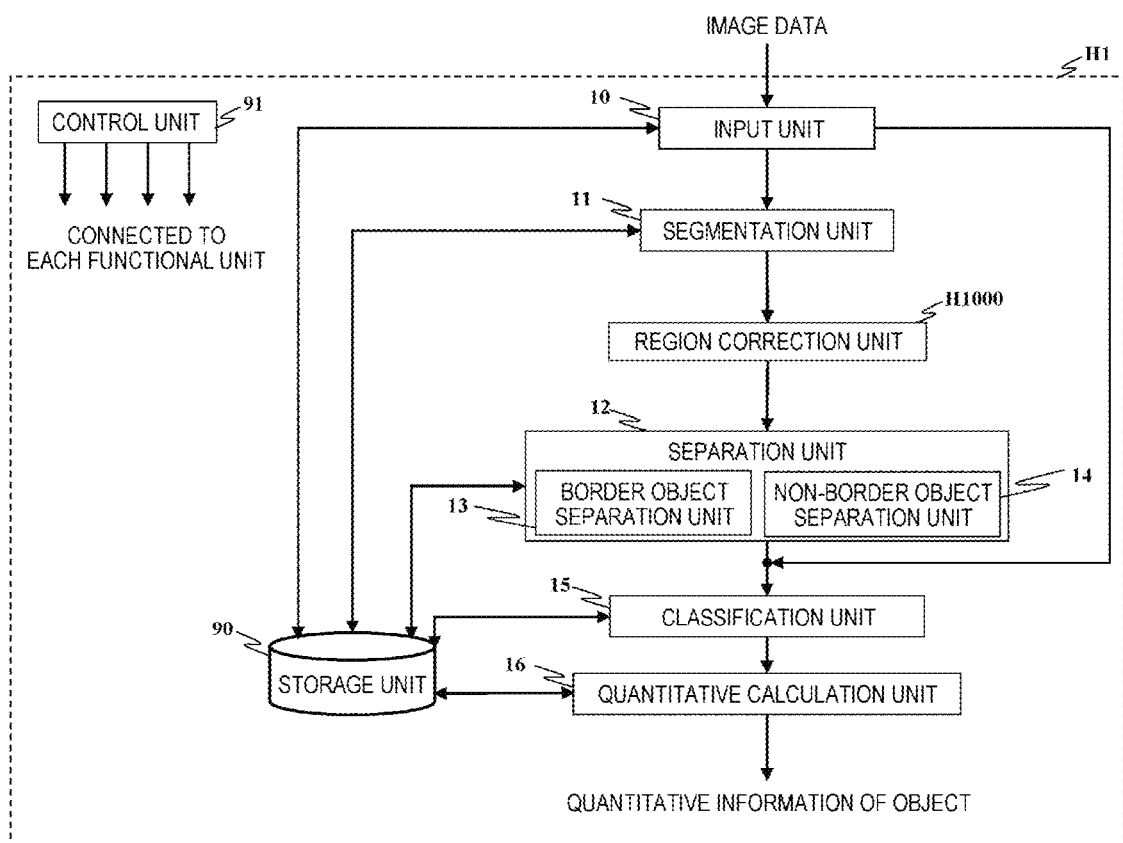
FIG. 22 is a block diagram showing a functional configuration of an image processing apparatus according to a second embodiment of the invention.

FIG. 22 is a block diagram showing a functional configuration of an image processing apparatus H1 according to the second embodiment of the invention. As shown in FIG. 22, the image processing apparatus H1 includes the input unit 10, the segmentation unit 11, a region correction unit H1000, the separation unit 12, the classification unit 15, the quantitative calculation unit 16, the storage unit 90, and the control unit 91. The separation unit 12 further includes the border object separation unit 13 and the non-border object separation unit 14. The functional units constituting the image processing apparatus H1 may be implemented as, for example, a software module or may be implemented as independent dedicated hardware.

The image processing apparatus H1 according to the second embodiment of the invention is different from the image processing apparatus 1 according to the first embodiment in that the image processing apparatus H1 includes the region correction unit H1000. Since the configuration of the image processing apparatus H1 is the same as that of the image processing apparatus 1 according to the first embodiment except that the image processing apparatus H1 includes the region correction unit H1000, the description of the same functional units will be omitted.

The region correction unit H1000 is a functional unit for correcting an incorrect background region that is generated in an image when, for example, the segmentation unit 11 segments a foreground and a background of the image. A process performed by the region correction unit H1000 will be described later.

Next, a hardware configuration of the image processing apparatus according to the second embodiment of the invention will be described with reference to FIG. 23.

Figure 23:
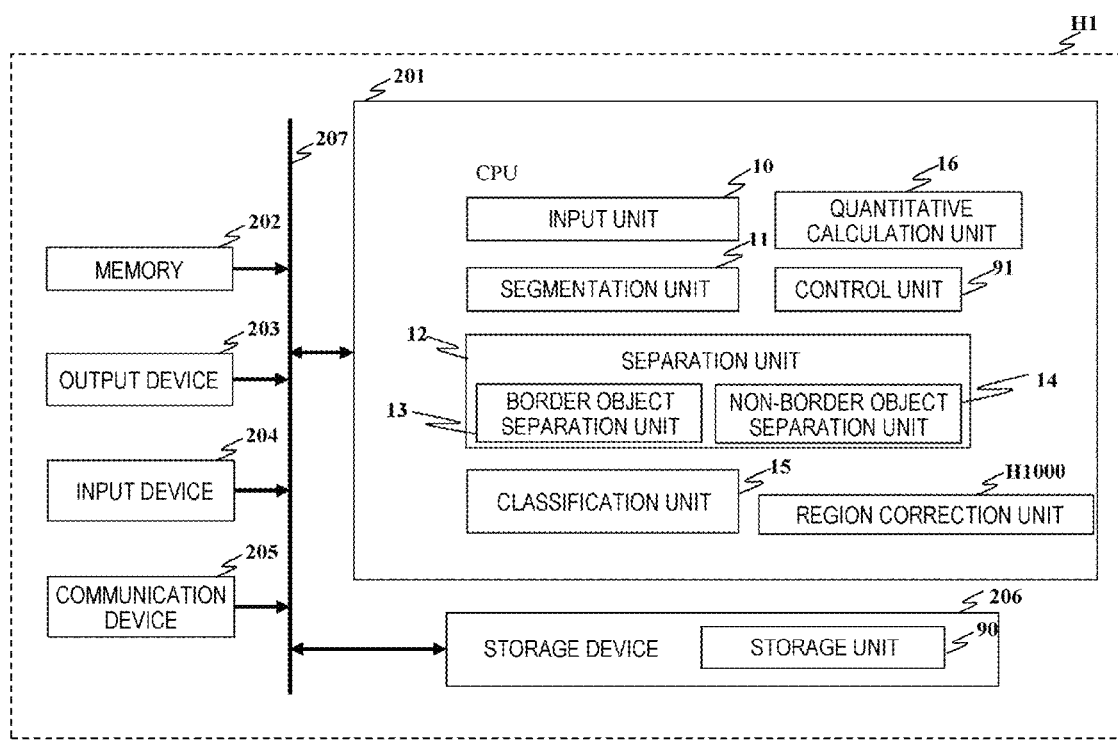
FIG. 23 is a block diagram showing an example of a hardware configuration of the image processing apparatus according to the second embodiment of the invention.

FIG. 23 is a block diagram showing an example of the hardware configuration of the image processing apparatus H1 according to the second embodiment of the invention. As shown in FIG. 23, the image processing apparatus H1 includes the CPU 201, the memory 202, the output device 203, the input device 204, the communication device 205, and the storage device 206. These devices are connected to each other by a bus 207.

The image processing apparatus H1 according to the second embodiment of the invention is different from the image processing apparatus 1 according to the first embodiment in that the image processing apparatus H1 includes the region correction unit H1000. Since the configuration of the image processing apparatus H1 is the same as that of the image processing apparatus 1 according to the first embodiment except that the image processing apparatus H1 includes the region correction unit H1000, the description of the same functional units will be omitted.

Figure 24:
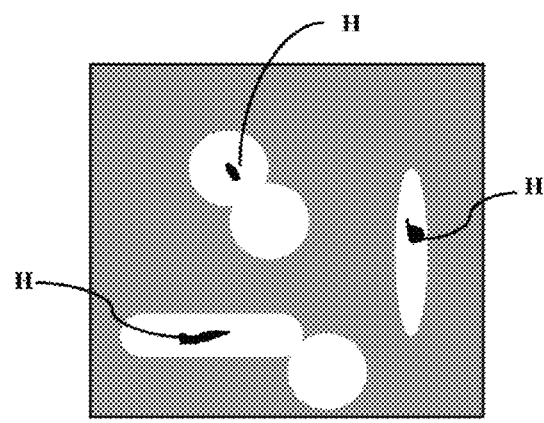
FIG. 24 is a diagram showing an example of a region correction process according to the second embodiment of the invention.

FIG. 24 is a diagram showing an example of an image including incorrect background regions. As shown in FIG. 24, among objects included in the foreground of the image, there are incorrect background regions H that are erroneously determined as the background region. These incorrect background regions H are generated, for example, when the above-described segmentation unit segments the foreground and the background of the image. When the incorrect background region H is present in the foreground, the accuracy of the separation process, the classification process, and the quantitative information calculation process described above may be reduced, and thus it is desirable to correct the incorrect background region H. Therefore, the region correction unit according to the second embodiment of the invention corrects the incorrect background region generated in the image, so that the quantitative information can be accurately calculated.

Figure 25:
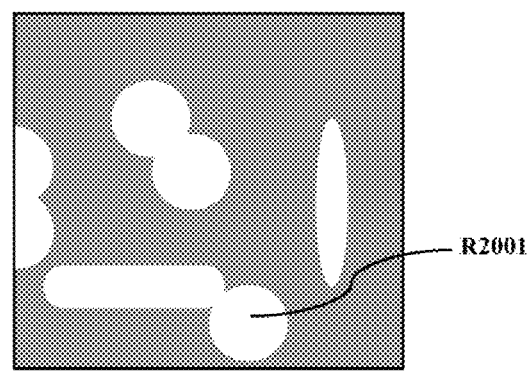
FIG. 25 is a diagram showing an example of an image obtained by a region correction unit according to the second embodiment of the invention correcting the image including the incorrect background regions shown in FIG. 24.

FIG. 25 is a diagram showing an example of an image obtained by the region correction unit according to the second embodiment of the invention correcting the image including incorrect background regions shown in FIG. 24. As shown in FIG. 25, by the region correction unit according to the second embodiment of the invention correcting the image including the incorrect background regions, the incorrect background regions H described above are corrected as the foreground region, and therefore, it is possible to smoothly perform the separation process, the classification process, and the quantitative information calculation process, and it is possible to accurately calculate the quantitative information.

Next, an example of a region correction process according to the invention will be described with reference to FIG. 26.

Figure 26:
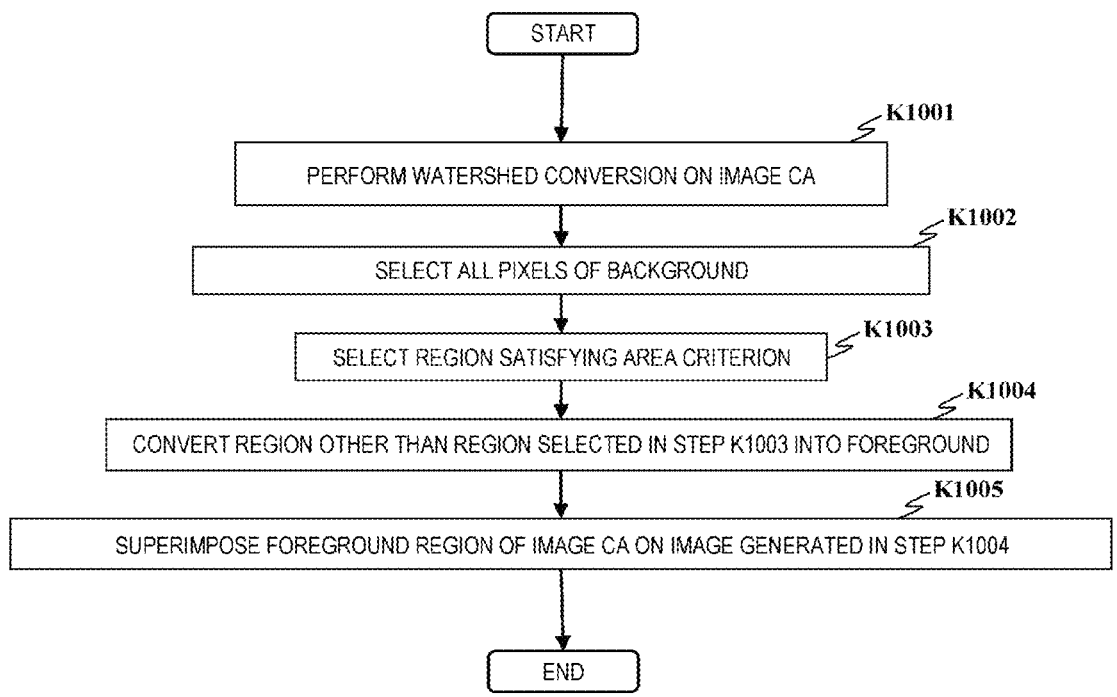
FIG. 26 is a flowchart showing an example of the region correction process according to the second embodiment of the invention.

FIG. 26 is a flowchart showing the region correction process according to the second embodiment of the invention. As described above, the region correction unit (for example, the region correction unit H1000 shown in FIGS. 22 and 23) according to the second embodiment of the invention can correct the incorrect background region by performing the following process on the image including the incorrect background region.

First, in step K1001, the region correction unit performs a so-called watershed conversion process on the image CA which is output by the above-described segmentation unit (for example, the segmentation unit 11 shown in FIG. 1) and in which the foreground and the background are segmented. In this watershed conversion, the image is regarded as a topographical surface, a pixel belonging to a region with a high altitude has a high luminance value, and a pixel belonging to a region with a low altitude has a low luminance value. By applying this watershed conversion to the image CA in which the foreground and the background are segmented, independent background regions are connected to other background regions, and an image in which one or more larger background regions are present is generated.

Next, in step K1002, the region correction unit selects all pixels (pixels having a luminance value of 0) belonging to the background from the image generated in step K1001.

Next, in step K1003, the region correction unit extracts a connected region satisfying a predetermined criterion (for example, a connected region having a maximum number of pixels) from the background pixels selected in step K1002, and sets the connected region as the background region.

Next, in step K1004, the region correction unit converts a black region (region having a luminance value of 0) other than the background region selected in step K1003 into the foreground. As a result, the background region (that is, the incorrect background region) included in, for example, the object of the foreground is corrected to the foreground region.

Next, in step K1005, the region correction unit superimposes the foreground region of the image CA which is output by the above-described segmentation unit and in which the foreground and the background are segmented on the image generated in step K1004. Specifically, the region correction unit converts pixels in the image generated in step K1004, which corresponds to pixel belonging to the foreground region in the image CA, into foreground pixels.

By executing the above-described steps K1001 to K1005, the region correction unit corrects the incorrect background regions existing in the image CA to the foreground region. By inputting the image output by the region correction unit to the 0 it is possible to more accurately separate objects in contact with each other.

Next, another example of the region correction process according to the invention will be described with reference to FIG. 27.

Figure 27:
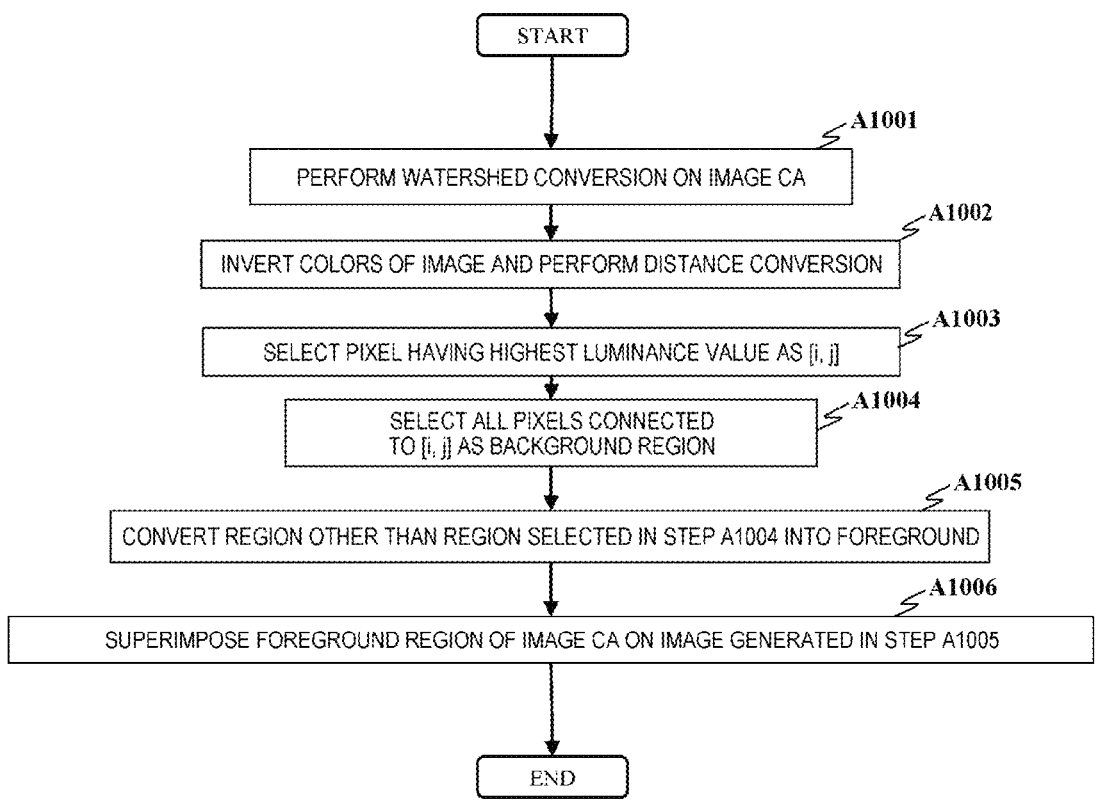
FIG. 27 is a flowchart showing an example of the region correction process according to the second embodiment of the invention.

FIG. 27 is a flowchart showing another example of the region correction process according to the second embodiment of the invention. As described above, the region correction unit (for example, the region correction unit H1000 shown in FIGS. 22 and 23) according to the second embodiment of the invention can correct the incorrect background region by performing the following process on the image including the incorrect background region.

First, in step A1001, the region correction unit performs a so-called watershed conversion process on the image CA which is output by the above-described segmentation unit (for example, the segmentation unit 11 shown in FIG. 1) and in which the foreground and the background are segmented. This watershed conversion is the same as the watershed conversion process performed in step K1001 of FIG. 26. By applying the watershed conversion to the image CA in which the foreground and the background are segmented, independent background regions are recognized as the same background region, and an image in which one or more larger background regions are present is generated.

Next, in step A1002, the region correction unit performs a distance conversion process on the image generated in step A1001 after inverting colors of the image. In the distance conversion process, an image (distance map) in which a distance from each background pixel to a foreground pixel closest to the corresponding background pixel is expressed as the luminance value is generated.

Next, in step A1003, the region correction unit selects a pixel having a highest luminance value as a pixel [i, j]. As a result, a background pixel farthest from the foreground region is selected.

Next, in step A1004, the region correction unit selects all the pixels connected to the pixel [i, j] selected in step A1003 as the background region.

Next, in step A1005, the region correction unit converts regions other than the background region selected in step A1004 into the foreground. As a result, the background region (that is, the incorrect background region) included in, for example, the object of the foreground is corrected to the foreground region.

Next, in step A1006, the region correction unit superimposes the foreground region of the image CA which is output by the above-described segmentation unit and in which the foreground and the background are segmented on the image generated in step A1005. Specifically, the region correction unit converts pixels in the image generated in step A1005, which corresponds to pixel belonging to the foreground region in the image CA, into foreground pixels.

By executing the above-described steps A1001 to A1006, the region correction unit corrects the incorrect background regions existing in the image CA to the foreground region. By inputting the image output by the region correction unit to the separation unit, it is possible to accurately separate objects in contact with each other.

By performing the region correction process described above, it is possible to obtain the merit that the accuracy of the separation process, the classification process, and the quantitative information calculation process described in the first embodiment is improved.

Third Embodiment

Next, an image processing system according to a third embodiment of the invention will be described with reference to FIGS. 28 and 29.

Figure 28:
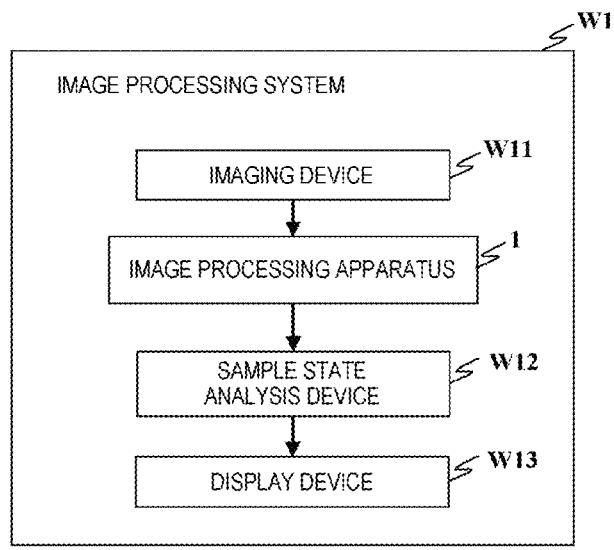
FIG. 28 is a diagram showing an example of an image processing system according to a third embodiment of the invention.

FIG. 28 is a diagram showing an example of an image processing system W1 according to the third embodiment of the invention. The image processing system W1 according to the third embodiment of the invention is an image processing system for calculating quantitative information on an object in an image by using the image processing apparatuses according to the first and second embodiments, analyzing a state of a sample by using the calculated quantitative information, and providing an analysis result to a user.

The image processing system W1 according to the third embodiment of the invention may be applied to analyze a state of, for example, blood, a material, or a cell.

As shown in FIG. 28, the image processing system W1 includes an imaging device W11, the image processing apparatus 1, a sample state analysis device W12, and a display device W13.

The imaging device W11 is a device for capturing an image of a sample (a blood cell, a material, a cell, or the like) serving as an object and generating an image. The imaging device W11 may be any device such as a camera or a scanning electron microscope as long as the device can capture an image.

The image processing apparatus 1 is the same as the image processing apparatus 1 described in the first and second embodiments. By the image processing apparatus 1 processing an image captured by the imaging device W11, quantitative information on the objects shown in the image can be generated.

The sample state analysis device W12 is a device that analyzes a sample state based on the quantitative information on the object shown in the image, which is supplied from the image processing apparatus 1. The sample state analysis device W12 may derive an analysis result regarding the object shown in the image by collating the quantitative information output from the image processing apparatus 1 with a dedicated database (not shown) that stores information on a specific field (medical care, physics, or the like).

For example, when the object shown in the image is a blood cell, the sample state analysis device W12 can derive an analysis result regarding a health condition of a patient by collating quantitative information such as the number of and a ratio of blood cells output from the image processing apparatus 1 with a database dedicated for blood analysis.

When the object shown in the image is a magnetic particle, the sample state analysis device W12 can derive an analysis result regarding magnetic characteristics of the sample by collating quantitative information such as a density of the magnetic particle output from the image processing apparatus 1 with a dedicated database including physics information.

The display device W13 is a device for presenting various data generated by the processes of the invention to a user. The display device W13 may display, for example, the image captured by the imaging device W11, the images and the quantitative information generated by the image processing apparatus 1, and information on a conclusion generated by the sample state analysis device W12. The display device may be any device such as a television, a display of a personal computer, or a screen of a mobile phone or a tablet as long as the device can present information.

Figure 29:
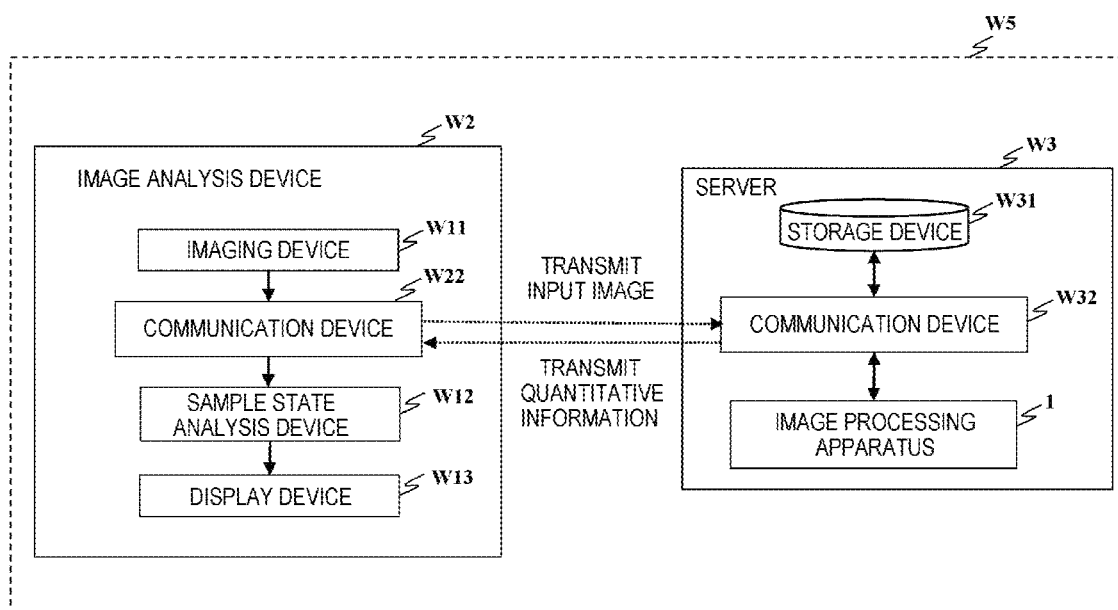
FIG. 29 is a diagram showing an example of the image processing system according to the third embodiment of the invention.

FIG. 29 is a diagram showing an example of an image processing system W5 according to the third embodiment of the invention. The image processing system W5 according to the third embodiment of the invention is an image processing system for calculating quantitative information on an object shown in an image by using the image processing apparatuses according to the first and second embodiments, analyzing a state of a sample by using the calculated quantitative information, and providing an analysis result to a user.

As shown in FIG. 29, the image processing system W5 includes an image analysis apparatus W2 and a server W3. The image analysis apparatus W2 and the server W3 are connected to each other via a communication network (not shown) such as the Internet.

The image analysis apparatus W2 has the same configuration as that of the image processing system W1 shown in FIG. 28 except that the image analysis apparatus W2 includes a communication device W22 for performing communication with the server W3 instead of the image processing apparatus 1, and thus, the description of the components will be omitted.

The server W3 is a remote server connected to the image analysis apparatus W2 via a communication network. As shown in FIG. 29, the server W3 includes the above-described image processing apparatus 1 (for example, the image processing apparatus 1 described in the first and second embodiments), a storage device W31, and a communication device W32. The server W3 receives an image captured by the imaging device W11 from the communication device W32 via the communication network, and stores the image in the storage device W31. Thereafter, the image processing apparatus 1 generates quantitative information by performing the processes described in the first and second embodiments on the stored image. Then, the communication device W32 transmits the quantitative information generated by the image processing apparatus 1 to the image analysis apparatus W2 via the communication network.

In the image analysis apparatus W2 that receives the quantitative information from the server W3, the sample state analysis device W12 described above analyzes the quantitative information, and the state of the sample shown in the image is analyzed, thereby obtaining an analysis result. The analysis result may be provided to the user via, for example, the display device W13.

Although not particularly shown in FIG. 28, the image processing system W1 may include a storage device that is used for storing an input image, attribute information on the input image, an intermediate processing result, the quantitative information calculated by the image processing apparatus 1, and the like. As the attribute information on the input image, for example, a code for identifying an acquisition source of the sample or information such as an acquisition date and time of the image is given.

By storing the input image, the attribute information on the input image, and the quantitative information calculated by the image processing apparatus 1 in the storage device, for example, quantitative information on each of images acquired from the same sample at different moments A and B is calculated, and a change in the quantitative information is analyzed, so that states of the sample or a change in the states can be analyzed.

The image processing system W1 may be used for applying any operation such as drug administration, temperature change, physical impact, or the like to the sample between the moment A and the moment B, and analyzing an influence of the operation, or may be used for analyzing how the sample is changed after a certain period of time elapses as in culture.

Further, by accumulating the quantitative information calculated by the image processing apparatus 1 in the storage device, the sample state analysis device W12 may calculate statistical information such as an average value or a variance value of the quantitative information, and may analyze the sample state by comparing the statistical information with quantitative information of an unknown image. In the storage device, the statistical information such as an average value or a variance value may be calculated and only the calculated statistical information may be stored instead of comprehensively storing the quantitative information. The quantitative information may be classified according to the attribute information of the input image, the statistical information may be calculated for each classification, and the sample state may be analyzed by using the calculated statistical information.

An image processing system using the storage device described above can also be applied to the image processing system W5 shown in FIG. 29. Since the image processing system W5 is the same as the image processing system W1 except that the storage device is located inside the server W3, the description thereof will be omitted.

According to the embodiments described above, the quantitative analysis can be accurately performed by separating the plural objects in contact with each other in an image and classifying the objects into the classes. In addition, it is possible to analyze a state of a sample in the image based on the calculated quantitative information.

The functions of the embodiments according to the invention may also be implemented by program codes of software. In this case, a storage medium in which a program code for implementing the functions of the invention is recorded may be supplied to an apparatus or a system, and a computing device (a CPU, an MPU, or the like) mounted in the apparatus or the system may read the program code and implement the program code. By executing the program code read from the storage medium by a computer, the functions of the above-described embodiments are implemented, and the program code, the storage medium, and the computing device themselves used for implementing the functions are constituent elements of the invention.

As the storage medium for recording the program code, for example, a flexible disk, a CD-ROM, a DVD-ROM, a hard disk, an optical disk, a magneto-optical disk, a CD-R, a magnetic tape, a nonvolatile memory card, or a ROM may be used.

Although the embodiments of the invention have been described above, the invention is not limited to the embodiments described above, and various modifications can be made without departing from the scope of the invention.

SIGN DESCRIPTION

1: IMAGE PROCESSING EQUIPMENT, 10: INPUT UNIT, 11: AREA DIVISION, 12: CONTACT SEPARATION UNIT, 13: BORDER OBJECT SEPARATION UNIT, 14: NON-BORDER OBJECT SEPARATION UNIT, 15: CLASSIFICATION PART, 16: QUANTITATIVE INFORMATION CALCULATION UNIT 90: STORAGE UNIT, 91: CONTROL UNIT, 201: CPU, 202: MEMORY, 203: OUTPUT DEVICE, 204: INPUT DEVICE, 205: COMMUNICATION DEVICE, 206: STORAGE DEVICE, 207: BUS

What is claimed is:

1. An image processing apparatus for calculating quantitative information on an object in an image, the image processing apparatus comprising:
    an input unit configured to input an image;
    a segmentation unit configured to segment a foreground and a background of the image;
    a separation unit configured to separate a plurality of objects in contact with each other in the image;
    a classification unit configured to classify the objects into classes; and
    a quantitative calculation unit configured to generate quantitative information on the object, wherein,
    the input unit receives an image for which the quantitative information is to be calculated,
    the segmentation unit segments the image into a foreground region and a background region, the foreground region being a region in which an object in the image for which the quantitative information is to be calculated is shown, and the background region being a region other than the foreground region,
    the separation unit detects, with respect to a first object and a second object in contact with each other in the image, a contact point between the first object and the second object based on a region segmentation result output by the segmentation unit, and separates the first object and the second object by connecting two boundary reference pixels including a first boundary reference pixel that is a pixel in a background region closest to the contact point, and a second boundary reference pixel that is a pixel in a background region in a direction opposite to the first boundary reference pixel across the contact point,
    the classification unit classifies each object in the image into a class, and
    the quantitative calculation unit generates and outputs quantitative information on the object based on the region segmentation result output by the segmentation unit, a separation result output by the separation unit, and a classification result output by the classification unit.

2. The image processing apparatus according to claim 1, wherein
    the separation unit includes a border object separation unit configured to separate a plurality of objects in contact with each other, which are present at an image edge, and a non-border object separation unit that separates a plurality of objects in contact with each other, which are present in a region other than the image edge, the border object separation unit extracts, with respect to the first object and the second object in contact with each other, which are present at an image edge, center regions representing each object from the foreground region in the region segmentation result output by the segmentation unit, and separates the first object and the second object based on a positional relationship between the center regions of the respective objects, and the non-border object separation unit uses the separation unit according to claim 1 to separate a first object and a second object in contact with each other, which are present in the region other than the image edge.

3. The image processing apparatus according to claim 1, further comprising:

a region correction unit configured to correct an incorrect background region in a foreground region included in the region segmentation result output by the segmentation unit, wherein the region correction unit specifies a background region in the region segmentation result based on a connection state or an area of the foreground region or the background region in the region segmentation result, so as to detect an incorrect background region in the foreground region included in the region segmentation result, and to convert the detected incorrect background region into the foreground region.

4. The image processing apparatus according to claim 1, wherein an object having a spherical shape or a shape similar to a circle in an image, or an object having a shape obtained by enlarging or reducing the spherical shape or the shape similar to a circle is set as a target to be calculated for the quantitative information.

5. The image processing apparatus according to claim 2, further comprising:

a region correction unit configured to correct an incorrect background region in a foreground region included in the region segmentation result output by the segmentation unit, wherein the region correction unit specifies a background region in the region segmentation result based on a connection state or an area of the foreground region or the background region in the region segmentation result, so as to detect an incorrect background region in the foreground region included in the region segmentation result, and to convert the detected incorrect background region into the foreground region.

6. The image processing apparatus according to claim 2, wherein an object having a spherical shape or a shape similar to a circle in an image, or an object having a shape obtained by enlarging or reducing the spherical shape or the shape similar to a circle is set as a target to be calculated for the quantitative information.

7. An image processing apparatus for calculating quantitative information on an object in an image, the image processing apparatus comprising:

a processor, a memory and a storage;
an input device configured to input an image;
a segmentation device configured to segment a background and a foreground of the image;
a separation device configured to separate objects in the image;
a classification device configured to classify the objects into classes; and a quantitative calculation device configured to generate quantitative information on the object, wherein, the input device receives an image for which the quantitative information is to be calculated, the segmentation device segments the image into the foreground including a first object and a second object and the background including a region other than the foreground, the separation device generates a distance map in which a distance from each pixel at least belonging to the first object and the second object to a background pixel closest to the corresponding pixel is expressed as a luminance value, specifies, in the distance map, a target pixel (P) whose a luminance value along a first axis is lower than a luminance value along a second axis, when a pixel along a positive direction of the first axis from the target pixel satisfies the following conditions a, b, and c, sets the pixel as a first boundary reference pixel ($P_R$), a) the pixel is the background pixel,
b) a first reference pixel further present in the positive direction of the pixel is the background pixel,
c) the first object and the second object are present in a positive direction and a negative direction of the second axis, and distances from the first boundary reference pixel to the first object and the second object are within a predetermined distance reference, when a pixel along a negative direction of the first axis from the target pixel satisfies the following conditions d, e, and f, sets the pixel as a second boundary reference pixel ($P_L$), d) the pixel is the background pixel,
e) a second reference pixel further present in the negative direction of the pixel is the background pixel,
f) the first object and the second object are present in the positive direction and the negative direction of the second axis, and distances from the second boundary reference pixel to the first object and the second object are within a predetermined distance reference, generates a line segment connecting the first boundary reference pixel and the second boundary reference pixel as a separation boundary line passing through the target pixel, and generates a final image in which the first object and the second object are separated along the separation boundary line, the classification device classifies the first object and the second object by the class, and the quantitative calculation device generates and outputs quantitative information on the first object and the second object.

8. An image processing method for calculating quantitative information on an object in an image, the image processing method comprising:

an input process of inputting an image;
a segmentation process of segmenting a foreground and a background of the image;
a separation process of separating a plurality of objects in contact with each other in the image;
a classification process of classifying the objects into classes; and
a quantitative information calculation process of generating quantitative information on the object, wherein,
in the input process, an image for which the quantitative information is to be calculated is received,
in the segmentation process, the image is segmented into a foreground region and a background region, the foreground region being a region in which an object in the image for which the quantitative information is to be calculated is shown, and the background region being a region other than the foreground region, in the separation process, with respect to a first object and a second object in contact with each other in the image, a contact point between the first object and the second object is detected based on a region segmentation result output by the segmentation process, and the first object and the second object are separated by connecting two boundary reference pixels including a first boundary reference pixel that is a pixel in a background region closest to the contact point, and a second boundary reference pixel that is a pixel in a background region in a direction opposite to the first boundary reference pixel across the contact point, in the classification process, the objects in the image are classified into a class, and in the quantitative information calculation process, quantitative information on the object is generated and output based on the region segmentation result calculated by the segmentation process, a separation result calculated by the separation process, and a classification result calculated by the classification process.

9. The image processing method according to claim 8, wherein the separation process further includes
 a border object separation process of separating a plurality of objects in contact with each other, which are present at an image edge, and
 a non-border object separation process of separating a plurality of objects in contact with each other, which are present in a region other than the image edge, in the border object separation process, with respect to the first object and the second object in contact with each other, which are present at an image edge, center regions representing each object are extracted from the foreground region in the region segmentation result calculated by the segmentation process, and the first object and the second object are separated based on a positional relationship between the center regions of the respective objects, and in the non-border object separation process, the separation process according to claim 6 is used as a method of separating a first object and a second object in contact with each other, which are present in the region other than the image edge.

10. The image processing method according to claim 8, further comprising:
 a region correction process of correcting an incorrect background region in a foreground region included in the region segmentation result calculated by the segmentation process, wherein
 in the region correction process, a background region in the region segmentation result is specified based on a connection state or an area of the foreground region or the background region in the region segmentation result, so as to detect an incorrect background region in the foreground region included in the region segmentation result, and convert the detected incorrect background region into the foreground region.

11. The image processing method according to claim 8, wherein
 an object having a spherical shape or a shape similar to a circle in an image, or an object having a shape obtained by enlarging or reducing the spherical shape or the shape similar to a circle is set as a target to be calculated for the quantitative information.

12. The image processing method according to claim 9, further comprising:
 a region correction process of correcting an incorrect background region in a foreground region included in the region segmentation result calculated by the segmentation process, wherein
 in the region correction process, a background region in the region segmentation result is specified based on a connection state or an area of the foreground region or the background region in the region segmentation result, so as to detect an incorrect background region in the foreground region included in the region segmentation result, and convert the detected incorrect background region into the foreground region.

13. An image processing method comprising:
 a process of generating, in an image in which a first object and a second object are in contact with each other, a distance map in which a distance from each pixel at least belonging to the first object and the second object to a background pixel closest to the corresponding pixel is expressed as a luminance value,
 a process of specifying, in the distance map, a target pixel (P) whose a luminance value along a first axis is lower than a luminance value along a second axis,
 a process of setting, when a pixel along a positive direction of the first axis from the target pixel satisfies the following conditions a, b, and c, the pixel as a first boundary reference pixel ($P_R$),
 a) the pixel is the background pixel,
 b) a first reference pixel further present in the positive direction of the pixel is the background pixel,
 c) the first object and the second object are present in a positive direction and a negative direction of the second axis, and distances from the first boundary reference pixel to the first object and the second object are within a predetermined distance reference,
 a process of setting, when a pixel along a negative direction of the first axis from the target pixel satisfies the following conditions d, e, and f, the pixel as a second boundary reference pixel ($P_L$),
 d) the pixel is the background pixel,
 e) a second reference pixel further present in the negative direction of the pixel is the background pixel,
 f) the first object and the second object are present in the positive direction and the negative direction of the second axis, and distances from the second boundary reference pixel to the first object and the second object are within a predetermined distance reference,
 a process of generating a line segment connecting the first boundary reference pixel and the second boundary reference pixel as a separation boundary line passing through the target pixel, wherein the contacted first and second objects are segmented to identify and classify each object in the process of generating the line segment, and
 a process of generating a final image in which the first object and the second object are separated along the separation boundary line.

14. An image processing system for determining a state of a sample, the image processing system comprising:
 an imaging device configured to acquire an image of a sample;
 an image processing apparatus configured to calculate quantitative information on an object in the image captured by the imaging device;

a sample state analysis device configured to analyze a state of the sample based on the quantitative information on the object that is output from the image processing apparatus; and a display device configured to present a sample state analysis result output by the sample state analysis device to a user, wherein, as the image processing apparatus, any of the image processing apparatuses according to claim 1 is used.

15. The image processing system according to claim 14, further comprising:

a storage device configured to store the image acquired by the imaging device and the quantitative information output by the image processing apparatus, wherein the storage device stores the image acquired by the imaging device, or the image and attribute information of the image, and quantitative information in association with each other.

16. The image processing system according to claim 15, wherein the image processing system includes an image analysis apparatus including the imaging device, the sample state analysis device, the display device, and a communication device configured to perform communication with an external device, and a server including the image processing apparatus, a communication device configured to perform communication with an external device, and a storage device configured to store the quantitative information output by the image processing apparatus and the like, wherein the communication device transmits and receives, between the image analysis apparatus and the server, the image captured by the imaging device in the image analysis apparatus and the quantitative information output by the image processing apparatus or the storage device in the server.

17. The image processing system according to claim 15, wherein the storage device stores attribute information indicating an acquisition source of the image acquired by the imaging device and the sample, and the quantitative information output by the image processing apparatus in association with each other, and the sample state analysis device calculates a state change of the sample by using a plurality of images that are input at different moments and have the same attribute information and quantitative information, and outputs information on the calculated state change of the sample as a sample state analysis result.

18. The image processing system according to claim 15, wherein the storage device accumulates the quantitative information output by the image processing apparatus, and the sample state analysis device calculates a statistical amount including an average value or a variance value based on the accumulated quantitative information output by the storage device, and outputs the analyzed state of the sample as a sample state analysis result by comparing the quantitative information on the image acquired by the imaging device with the statistical amount.

19. The image processing system according to claim 16, wherein the storage device stores attribute information indicating an acquisition source of the image acquired by the imaging device and the sample, and the quantitative information output by the image processing apparatus in association with each other, and the sample state analysis device calculates a state change of the sample by using a plurality of images that are input at different moments and have the same attribute information and quantitative information, and outputs information on the calculated state change of the sample as a sample state analysis result.

20. The image processing system according to claim 16, wherein the storage device accumulates the quantitative information output by the image processing apparatus, and the sample state analysis device calculates a statistical amount including an average value or a variance value based on the accumulated quantitative information output by the storage device, and outputs the analyzed state of the sample as a sample state analysis result by comparing the quantitative information on the image acquired by the imaging device with the statistical amount.

\* \* \* \* \*